US010990847B2

(12) United States Patent
Samarev et al.

(10) Patent No.: US 10,990,847 B2
(45) Date of Patent: Apr. 27, 2021

(54) PREDICTION OF BUSINESS OUTCOMES BY ANALYZING IMAGE INTERESTS OF USERS

(71) Applicant: DOTIN INC., San Jose, CA (US)

(72) Inventors: Roman Samarev, San Jose, CA (US); Ganesh Iyer, San Jose, CA (US)

(73) Assignee: DOTIN INC., San Jose, CA (US)

( * ) Notice: Subject to any disclaimer, the term of this patent is extended or adjusted under 35 U.S.C. 154(b) by 96 days.

(21) Appl. No.: 16/213,204

(22) Filed: Dec. 7, 2018

(65) Prior Publication Data

US 2020/0184263 A1  Jun. 11, 2020

(51) Int. Cl.
G06K 9/62 (2006.01)
G06K 9/46 (2006.01)
G06Q 10/08 (2012.01)
G06F 3/0484 (2013.01)

(52) U.S. Cl.
CPC ......... *G06K 9/6254* (2013.01); *G06K 9/4652* (2013.01); *G06K 9/6268* (2013.01); *G06Q 10/087* (2013.01); *G06F 3/04842* (2013.01)

(58) Field of Classification Search
CPC .. G06K 9/6254; G06K 9/4652; G06K 9/6268; G06K 9/00677; G06K 9/4628; G06K 9/6293; G06K 9/00409; G06Q 10/087; G06Q 30/0202; G06F 3/04842; G06F 16/951; G06T 7/13; G06N 3/08; G06N 3/0445; G06N 3/0454
See application file for complete search history.

(56) References Cited

U.S. PATENT DOCUMENTS

2017/0193533 A1* 7/2017 Lai ........................... G06N 3/08
2017/0364744 A1* 12/2017 Savchenkov ............ G06T 7/13

OTHER PUBLICATIONS

Stroop effect, Wikipedia, Oct. 2018 https://web.archive.org/web/20181026055326/https://en.wikipedia.org/wiki/Stroop_effect (Year: 2018).*

* cited by examiner

*Primary Examiner* — Jianxun Yang
(74) *Attorney, Agent, or Firm* — Chip Law Group

(57) ABSTRACT

A method and a system for predicting business outcomes for a target user are provided. The method includes generation of a plurality of images such that each image includes a set of colored-blocks arranged in rows and columns and a unique pattern formed by a subset of colored-blocks in the corresponding set of colored-blocks. Each unique pattern is associated with at least one psychometric feature. The plurality of images are presented to the target user for selection. The method further includes receiving a set of images selected by the target user from the plurality of images and analyzing each image to derive psychometric features of the target user. One or more business outcomes are predicted for the target user based on the derived psychometric features and one or more predictor models.

20 Claims, 18 Drawing Sheets

PREDICTION OF BUSINESS OUTCOMES BY ANALYZING IMAGE INTERESTS OF USERS

FIELD

Various embodiments of the disclosure relate generally to business enhancement using machine learning. More specifically, various embodiments of the disclosure relate to prediction of business outcomes by analyzing image interests of users.

BACKGROUND

There are always risks associated with initiating new endeavors, especially in a business. The severity of these risks, however, may be substantially minimized if potential outcomes, both positive and negative, are predicted. For an individual, it may include getting suggestion for a suitable job profile, while for an organization, such as an e-commerce service provider, it may include identifying purchase behavior of customers to suitably adjust their inventory to target the customers. Likewise, for increasing work productivity and efficiency of its employees, a business organization may determine job affinity of the employees and accordingly allocate different work profiles and tasks to the employees.

Psychometric analysis plays an important role in identifying the potential business outcomes for users and organizations. A known technique of psychometric analysis includes interviewing, where an interviewer may have a close interaction with an interviewee and observe conscious, subconscious, and semiconscious behavior of the interviewee. Generally, interviewing is more focussed on personal judgement of the interviewer. However, personal judgement, even that of an expert, has no guarantee of being reliable and meaningful in actual practice. Another known technique of psychometric analysis involves analyzing psychosocial reactions of users to artificially created situations, such as Thematic Apperception Test (TAT), Word Association Test (WAT), and the like. However, such tests fail to consider recent activities and behavioural changes of the users for psychometric analysis, thus making the results of psychometric analysis less accurate.

In light of the foregoing, there exists a need for a solution that overcomes the aforementioned problems and provides accurate business outcomes.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

Prediction of business outcomes by analyzing image interests of users is provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

DETAILED DESCRIPTION

Figure 1:
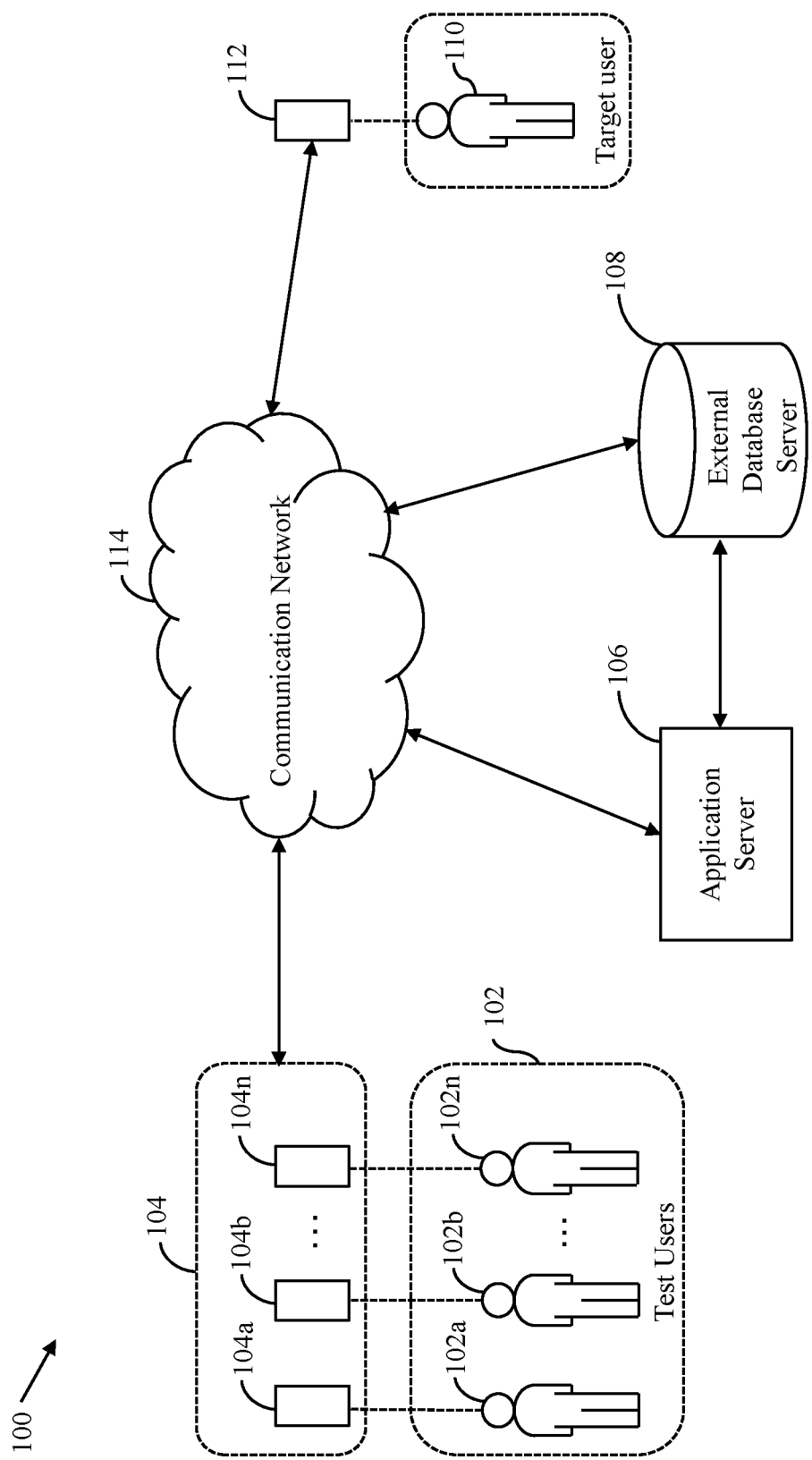
FIG. 1 is a block diagram that illustrates an exemplary environment for prediction of business outcomes by analyzing image interests of users, in accordance with an embodiment of the disclosure.

Certain embodiments of the disclosure may be found in an apparatus for predicting business outcomes by analyzing image interests of users. Exemplary aspects of the disclosure provide methods and systems for predicting business outcomes for users. The method includes generating, by a server, a first plurality of images such that each image may include a corresponding set of colored-blocks and a corresponding unique pattern that may be formed by a subset of colored-blocks in the corresponding set of colored-blocks.

Each unique pattern may be associated with at least one psychometric feature of a plurality of psychometric features. The server may be configured to render a user interface on a user device of a target user to present the first plurality of images for selection. The server may be configured to receive a first set of images selected by the target user from the first plurality of images. The server may be further configured to predict one or more psychometric features of the target user based on the unique pattern included in each image of the first set of images, such that the predicted one or more psychometric features of the target user may be included in the plurality of psychometric features. One or more business outcomes for the target user may be predicted by the server based on the one or more psychometric features of the target user.

Another embodiment provides the system for predicting business outcomes for users. The system includes a server that may be configured to generate a first plurality of images such that each image may include a corresponding set of colored-blocks and a corresponding unique pattern that may be formed by a subset of colored-blocks in the corresponding set of colored-blocks. Each unique pattern may be associated with at least one psychometric feature of a plurality of psychometric features. The server may be configured to render a user interface on a user device of a target user to present the first plurality of images for selection. The server may be configured to receive a first set of images selected by the target user from the first plurality of images. The server may be further configured to predict one or more psychometric features of the target user based on the unique pattern included in each image of the first set of images, such that the predicted one or more psychometric features of the target user may be included in the plurality of psychometric features. The server may be configured to predict one or more business outcomes for the target user based on the one or more psychometric features of the target user.

The disclosure includes the prediction of business outcomes by analyzing images that accurately reflect one's subconscious mind. As the subconscious mind is responsible for a majority of decision-making tasks and is directly related to an individual's personality, the disclosure yields more accurate results in comparison to related techniques. Moreover, the behavioral changes of an individual are directly reflected by the choice of images made by the individual. For example, a person's liking towards a particular image may vary based on an emotional state of the person. In one exemplary scenario, the predicted business outcomes may be used by an organization for improving marketing strategies and in turn expanding business. For example, the organization may target a specific group of customers for advertising a newly launched product or service when the customers of the group have high purchase affinity (i.e., a business outcome) for the product and/or service. In another exemplary scenario, the predicted business outcomes may be used by an organization to simplify resource management. For example, E-commerce industries may use the predicted business outcomes (such as predicted inventory requirements) to manage their inventory. Likewise, airline industry may use the predicted business outcomes to customize ticket prices to attract more customers.

FIG. 1 is a block diagram that illustrates an exemplary environment 100 for prediction of business outcomes by analyzing image interests of users, in accordance with an embodiment of the disclosure. The environment 100 includes test users 102a-102n (hereinafter designated and referred to as "the test users 102"), test-user devices 104a-104n (hereinafter designated and referred to as "the test-user devices 104"), an application server 106, and an external database server 108. The environment 100 further includes a target user 110 and a target-user device 112. The test-user devices 104, the application server 106, the external database server 108, and the target-user device 112 may communicate with each other by way of a communication network 114 or any other communication means established therebetween.

The test users 102 are individuals, whose sample data may be used to generate predictor models for predicting business outcomes for the target user 110. The sample data of the test users 102 may include historical data of the corresponding test users 102, images that are of interest to the corresponding test users 102, and answers provided by the corresponding test users 102 to various psychometric questions. The historical data of the test users 102 may refer to data collected based on past events pertaining to the test users 102. The historical data may include data generated either manually or automatically by the test users 102. For example, the historical data of the test user 102a may include curriculum information, education particulars, travel history, activity on social media platforms, employment details, and purchase history of the test user 102a. The historical data of the test user 102a may further include an activity log of the test user 102a on the internet and various social media platforms. The answers to the psychometric questions may be provided by the test user 102a when the psychometric questions are presented to the test user 102a through various online tests (such as, but not limited to, the multiple intelligence quiz, the BIG 5, or the personal globe inventory) on the test-user device 104a. The images that are of interest to a test user 102a may include sample images selected by the test user 102a from a set of sample images presented by the application server 106. Each sample image may further include a corresponding unique pattern of colored-blocks, such that the unique pattern may be a subset of colored-blocks present in the sample image. A "colored-block" may be a portion of an image having a single color. All colored-blocks in the image may have same dimension, size, and shape. The colored-blocks may be arranged in rows and columns. A "unique pattern" may correspond to a unique arrangement of the colored-blocks in an image, such that no two images have a same unique pattern.

The test-user devices 104 may include suitable logic, circuitry, interfaces, and/or code, executable by the circuitry, that may be configured to perform one or more operations for providing the sample data of the test users 102a-102n to the application server 106. In one exemplary scenario, the test-user devices 104 may refer to communication devices of the test users 102. The test-user devices 104 may be configured to allow the test users 102 to communicate with the application server 106 and the external database server 108. The test-user devices 104 may be configured to serve as an interface for providing the sample data of the corresponding test users 102 to the application server 106. In one embodiment, the test-user device 104a may be configured to run or execute a software application (e.g. a mobile application or a web application), which may be hosted by the application server 106, for presenting various sample images and psychometric questions to the test user 102a, and communicating a response of the test user 102a to the application server 106. The response may include a list of sample images from the presented images that are liked by the test user 102a and the answers provided by the test user 102a to the psychometric questions. The test-user device 104a may be further configured to retrieve the historical data of the test user 102a by accessing a social media profile of the test user 102a based on the consent of the test user 102a. Likewise, the test-user devices 104b-104n of the other test users 102b-102n may be configured to provide the sample data of the other test users 102b-102n to the application server 106. Examples of the test-user devices 104 may include, but are not limited to, mobile phones, smartphones, laptops, tablets, phablets, or other devices capable of communicating via the communication network 114.

The application server 106 may include suitable logic, circuitry, interfaces, and/or code, executable by the circuitry, that may be configured to perform one or more operations for predicting business outcomes. The application server 106 may be a physical or cloud data processing system on which a server program runs. The application server 106 may be implemented in hardware or software, or a combination thereof. The application server 106 may be configured to generate the sample images based on a set of rules and present them to the test users 102 for selection. The application server 106 may be further configured to retrieve the sample data of the test users 102 and store the sample data of the test users 102 in the external database server 108. The application server 106 may be configured to host the software application that runs on the test-user devices 104 for retrieving the sample data of the test user 102. The application server 106 may be configured to use a tracker or a web crawler to track activities of the test users 102 on the internet and the social media platforms for retrieving the sample data.

The application server 106 may be configured to implement a learning phase based on the sample data for generating the predictor models. The predictor models may be statistical models generated by means of machine learning algorithms. Examples of the algorithms used for generating the predictor models may include, but are not limited to, a Support Vector Machine (SVM), a Logistic Regression model, a Bayesian Classifier model, a Decision Tree Classifier, a Copula-based Classifier, a K-Nearest Neighbors (KNN) Classifier, a Random Forest (RF) Classifier, or Artificial neural networks.

After the generation of the predictor models, the application server 106 may be configured to implement a prediction phase in which the predictor models are used to predict the business outcomes for the target user 110 based on various inputs received from the target user 110 (hereinafter the inputs received from the target user 110 are designated and referred to as "the target data"). In one embodiment, the business outcomes may include employment suggestions, compatibility match, product purchase affinity, color affinity, work affinity, image suggestions, and/or the like. In another embodiment, the business outcomes may include work affinity of employees, inventory suggestions, travel trend, purchase trend, and/or the like. Examples of the application server 106, include, but are not limited to, computers, laptops, mini-computers, mainframe computers, any non-transient and tangible machines that may execute a machine-readable code, a cloud-based server, or a network of computer systems. The application server 106 may be realized through various web-based technologies, such as, but not limited to, a Java web-framework, a .NET framework, a PHP framework, or any other web-application framework.

Various functional elements of the application server 106 have been described in detail in conjunction with FIG. 2 and generation of the predictor models is described later in FIG. 3.

The external database server 108 may include suitable logic, circuitry, interfaces, and/or code, executable by the circuitry, that may be configured to perform one or more operations for managing and storing various forms of data. In one embodiment, the external database server 108 may be implemented as a local memory of the application server 106. In another embodiment, the external database server 108 may be implemented as a cloud-based server working in conjunction with the application server 106. The external database server 108 may be configured to store data, such as the sample data provided the test users 102, the target data retrieved from the target user 110, the set of rules for generating the sample images, and the predictor models generated by the application server 106. The external database server 108 may be configured to receive a query from the application server 106 to extract data stored in the memory of the external database server 108. Based on the received query, the external database server 108 may be configured to provide the requested data to the application server 106 over the communication network 114. Examples of the external database server 108 may include, but are not limited to, MySQL® and Oracle®.

The target user 110 may be an individual, whose target data may be used as input to the predictor models for predicting the business outcomes. The target data may include various images selected by the target user 110 from the sample images presented by the application server 106. The target data may further include answers provided by the target user 110 to the psychometric questions and/or historical data of the target user 110. The application server 106 may obtain the target data in a manner that is similar to obtaining the sample data of the test users 102. In one exemplary scenario, the target user 110 may be an individual interested in determining a compatibility match or an individual seeking suggestion regarding employment. In another exemplary scenario, the target user 110 may be a representative of an organization who wants to know future business outcomes pertaining to a new policy implementation. In another exemplary scenario, the target user 110 may be an employee of the organization, whose employment affinity (i.e., a business outcome) is of interest to the organization. In another exemplary scenario, the target user 110 may be a customer whose purchase behavior is of interest to a business industry, such as an e-commerce industry. The target data may include various images selected by the target user 110 from the sample images presented by the application server 106, answers provided by the target user 110 to the psychometric questions, and/or historical data of the target user 110. The application server 106 may be configured to obtain the target data in a manner that is similar to obtaining the sample data of the test users 102

The target-user device 112 may include suitable logic, circuitry, interfaces, and/or code, executable by the circuitry, that may be configured to perform one or more operations for providing the target data of the target user 110 to the application server 106. In one exemplary scenario, the target-user device 112 may refer to a communication device of the target user 110. The target-user device 112 may be configured to allow the target user 110 to communicate with the application server 106 and the external database server 108. The target-user device 112 may be configured to present the sample images to the target user 110 and provide the target data to the application server 106. In one embodiment, the target-user device 112 may be configured to run or execute the software application, which is hosted by the application server 106, for presenting the sample images to target user 110 for selection, and various psychometric questions to the target user 110 for answering. The target-user device 112 may be further configured to communicate response of the target user 110 to the application server 106. The response may include the images that are liked by the target user 110 from the sample images and the answers provided by the target user 110 to the psychometric questions. The target-user device 112 may be further configured to retrieve the historical data of the target user 110 by accessing a social media profile of the target user 110 based on a consent of the target user 110. Examples of the target-user device 112 include, but are not limited to, a mobile phone, a smartphone, a laptop, a tablet, a phablet, or any other device capable of communicating via any communication network.

The communication network 114 may include suitable logic, circuitry, interfaces, and/or code, executable by the circuitry, that may be configured to transmit contents and messages between various entities, such as the test-user devices 104, the application server 106, the external database server 108, and/or the target-user device 112. Examples of the communication network 114 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the application server 106 may be configured to generate the sample images having unique patterns of colored-blocks. These sample images may be presented to multiple test users for selection. The application server 106 may be further configured to predict of the business outcomes in two phases, such as the learning and prediction phases. The learning phase may focus on generation of the predictor models. During the learning phase, the application server 106 may be configured to retrieve the sample data from the test users 102. The sample data may include the historical data of the test users 102, the sample images that are liked by the test users 102, and the answers provided by the test users 102 to the psychometric questions. During the learning phase, the application server 106 may be configured to analyze the sample data for generating the predictor models. For example, the images that are liked by the test users 102 may be analyzed to extract the feature values for the image features that are object agnostic. The answers provided by the test users 102 may be analyzed to derive the psychometric features, such as personality attributes, of the test users 102. The psychometric features may refer to behavioral qualities or characteristics of an individual's persona. Personality attributes (such as BIG5 attributes and Holland occupational themes) are one example of psychometric features. As per BIG5 attributes, the personality attributes may be classified into five areas of: neuroticism, openness, conscientiousness, extraversion, and agreeableness. As per Holland occupational themes, the personality attributes may be classified into six categories: Realistic (Doers), Investigative (Thinkers), Artistic (Creators), Social (Helpers), Enterprising (Persuaders), and Conventional (Organizers). Other examples of psychometric features may include, but are not limited to, Gardener's Multiple Intelligences theory related attributes, emotional attributes, aesthetic preferences, and the like. Likewise, the historical data of each test user 102 may be filtered and normalized to remove irrelevant information. The application server 106 may be further configured to utilize the analyzed sample data as input for the machine learning algorithms to generate the predictor models. The analyzed sample data and the predictor models may be stored in the database server 108.

The learning phase may be followed by the prediction phase. During the prediction phase, the application server 106 may be configured to employ one or more machine learning algorithms to modify the sample images for generating new sample images, such that the unique pattern of each previous sample image may be retained in its corresponding modified sample image. The sample images may be modified by altering an arrangement of colored-blocks or by altering the colors of the colored-blocks. In one scenario, a position of the unique pattern may be also retained in the modified sample image. However, in another scenario, the position of the unique pattern in the modified sample image may not be retained. The application server 106 may be configured to present the modified sample images to the target user 110 through the target-user device 112. The application server 106 may be further configured to retrieve the target data of the target user 110. The target data may include one or more images that are liked by the target user 110 from the sample mages, answers provided by the target user 110 to the psychometric questions, and/or the historical data of the target user 110. The application server 106 may be further configured to analyze the target data for predicting the business outcomes. For example, the answers provided by the target user 110 may be analyzed to derive the psychometric features, such as personality attributes, of the target user 110 and the images may be analyzed to extract feature values corresponding to the image features. In one embodiment, the application server 106 may be further configured to analyze the historical data of the target user 110 and the images that are liked by the target user 110 to predict psychometric features of the target user 110. The application server 106 may be further configured to use the derived and predicted psychometric features, the extracted feature values, and/or the analyzed historical data as input to the predictor models for predicting the business outcomes. The learning phase is explained in detail in conjunction with FIG. 3 and the prediction phase is explained in detail in conjunction with FIGS. 4-7.

Figure 2:
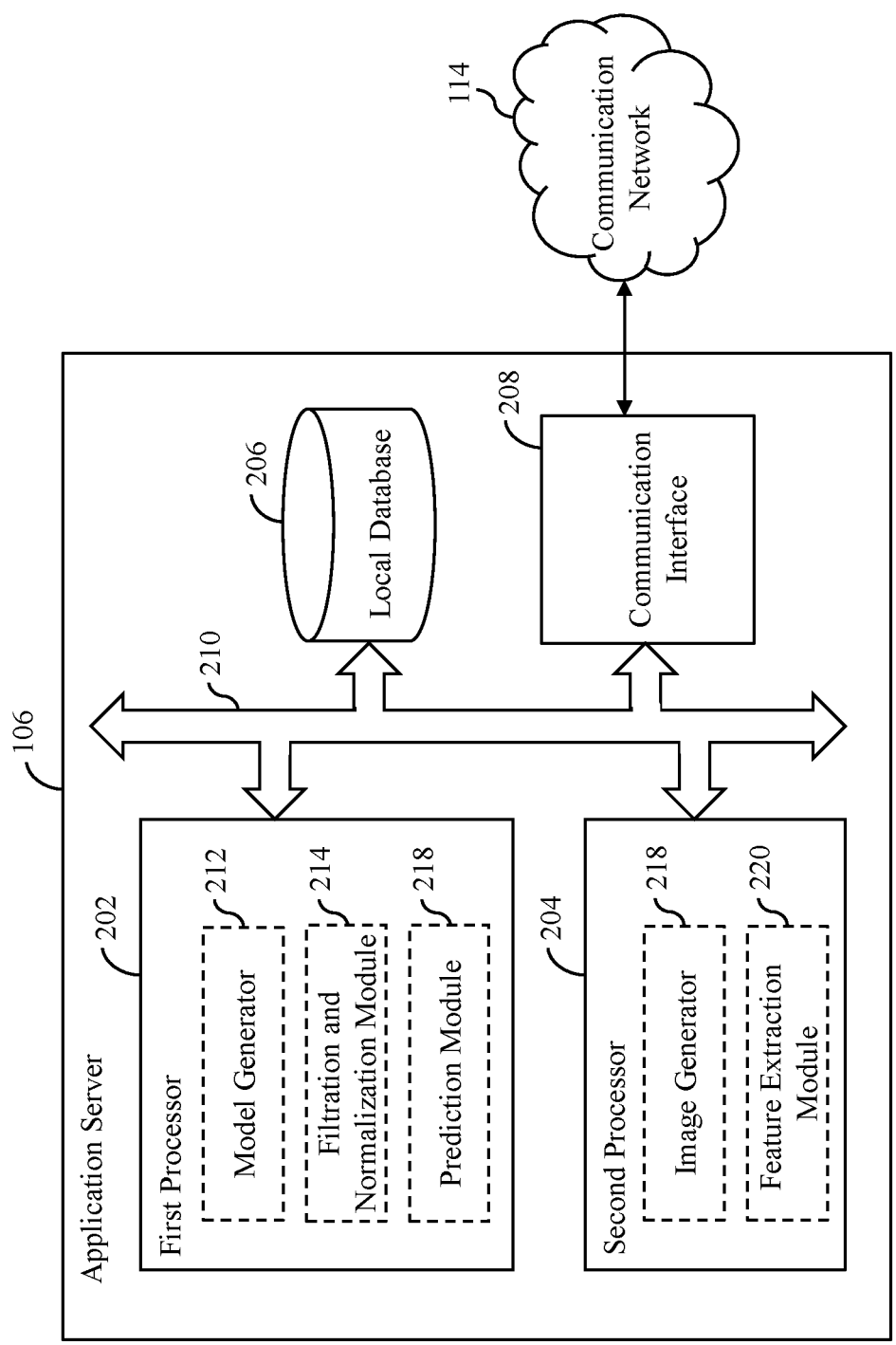
FIG. 2 is a block diagram that illustrates an application server of FIG. 1, in accordance with an embodiment of the disclosure.

FIG. 2 is a block diagram that illustrates the application server 106, in accordance with an embodiment of the disclosure. The application server 106 may include first and second processors 202 and 204, a local database 206, and a communication interface 208. The first and second processors 202 and 204, the local database 206, and the communication interface 208 may communicate with each other by means of a communication bus 210.

The first processor 202 may include suitable logic, circuitry, interfaces, and/or code, executable by the circuitry, that may be configured to perform one or more operations for implementing the learning and prediction phases. The first processor 202 may be configured to obtain the sample data of the test users 102 and the target data of the target user 110. The first processor 202 may be configured to analyze the answers provided by the test users 102 and the answers provided by the target user 110 to the psychometric questions to derive psychometric features for the test users 102 and the target user 110, respectively. Examples of the psychometric features may include, but are not limited to, skills and knowledge, abilities, attitudes, emotional attributes, aesthetic preferences, personality attributes, lifestyles and tastes, and/or RIASAC Holland occupational themes. The first processor 202 may include multiple functional blocks, such as: a model generator 212, a filtration and normalization module 214, and a prediction module 216. Examples of the first processor 202 may include, but are not limited to, an application-specific integrated circuit (ASIC) processor, a reduced instruction set computing (RISC) processor, a complex instruction set computing (CISC) processor, a field-programmable gate array (FPGA), and the like.

The second processor 204 may include suitable logic, circuitry, interfaces, and/or code, executable by the circuitry, that may be configured to perform one or more operations for image analysis. The second processor 204 may be an image processor that may include an image generator 218 and a feature extraction module 220. The image generator 218 may include suitable logic, circuitry, interfaces, and/or code, executable by the circuitry, that may be configured to generate various sample images to be presented to the test users 102 and the target user 110 for selection. The feature extraction module 220 may include suitable logic, circuitry, interfaces, and/or code, executable by the circuitry, that may be configured to extract feature values for various image features from the images the test users 102 and the target user 110. The image features may include, but are not limited to, color distribution, curves in an image, tonality of an image, semantics, or the like. Tonality is the distribution of tones in an image and defines an overall subjective quality of color tones in the image. Tonality includes overall and local contrast in the image, highlight and shadow qualities in the image, and/or the like. Color distribution is a graph that indicates a color level (i.e., number of pixels of each color in the image) in the image as per RGB, CIELUV, or CIELAB color space. Curve in an image is a high-level representation of various shapes present in the image. This representation may be both object agnostic and dependent on a context of representation. The semantics are indicative of contextual meaning conveyed by one or more shapes in the image. For example, two different images may have similar background color, shapes but they may convey different contextual meaning, such as an image of a woman diving under water vs another image of a woman drowning. The object agnostic image features may be independent of one or more objects (such as tags, labels, metadata, or any textual description added to the images) associated with the images. For example, feature values for these object agnostic image features extracted from a first image having a first set of labels may be different from feature values extracted from a second image having the same labels. In one embodiment, the second processor 204 may be configured to use a contextual meaning conveyed by various shapes in the images to extract semantics, curves and shapes from the images. Examples of the second processor 204 may include, but are not limited to, a digital signal processor (DSP), an ASIC processor, a RISC processor, a CISC processor, an FPGA, and the like.

The image generator 218 may be configured to generate the sample images based on the set of rules. For example, a first rule may state that the sample images should include colored-blocks arranged in rows and columns. A colored-block should include pixels of same color. A second rule may state that a combination of colored-blocks that is chosen to form a sample image should represent a known emotional state (for example as represented by Kobayashi color distribution, or the like), a known personality feature, or the like. Examples of emotional states and personality features represented by various color distribution may include, bright and clear colors convey sweet flavors, whereas pale tones create dream-like atmosphere, and light colors convey a feeling of softness and delicacy, or the like.

It will be apparent to a person of ordinary skill in the art that the abovementioned rules are described for exemplary purpose and should not be construed to limit the scope of the disclosure. The image generator 218 may be configured to use machine learning algorithms to generate the sample images. Once the sample images are generated, the image generator 218 may be further configured to modify the sample images before presenting to users (such as the test users 102 or the target user 110).

The model generator 212, the filtration and normalization module 214, and the feature extraction module 220 may include suitable logic, circuitry, interfaces, and/or code, executable by the circuitry, that may be configured to implement the learning phase for generating the predictor models. During the learning phase, the sample data may be retrieved and analyzed. For example, the model generator 212 may be configured to analyze the answers provided by the test users 102 for deriving the psychometric features of the test users 102, the filtration and normalization module 214 may be configured to analyze the historical data of the test users 102, and the feature extraction module 220 may be configured to analyze the sample images selected by the test users 102. The model generator 212 may be configured to use the normalized and filtered historical data, the derived psychometric features, and the extracted feature values for generating the predictor models. For the generation of the predictor models, the model generator 212 may be configured to use various machine learning algorithms such as, but not limited to, regression based predictive learning and neural networks based predictive leaning. In one embodiment, the model generator 212 may be further configured to update the predictor models to improve its prediction accuracy based on a feedback provided by the target user 110 on relevance of the predicted business outcomes.

The filtration and normalization module 214 may be configured to normalize and filter the historical data of the test users 102 and the target user 110. For example, the filtration and normalization module 214 may be configured to filter out the commonly used words (such as "the", "is", "at", "which", "on", and the like) as irrelevant information from the historical data and normalize the remaining historical data to make it more meaningful. In another example, the historical data may be filtered to parse specific keywords. The parsed keywords may include a stream of numbers that represents a mobile number and keywords related to personality, job, likes, dislikes, and the like. The parsed keywords may further correspond to one or more named entities that are related to specific entities (such as: formal or informal names of various institutions, or the like) or actions (such as a sport activity with reference to a place description and a club name) of the test users 102 and the target user 110.

The prediction module 216 may include suitable logic, circuitry, interfaces, and/or code, executable by the circuitry, that may be configured to implement the prediction phase for predicting the business outcomes by using the target data as input to the predictor models. In one embodiment, the prediction module 216 may be configured to use the predictor models to predict psychometric features based on the normalized and filtered historical data and the extracted feature values. The predicted psychometric features may also be used as input for predicting the business outcomes.

The local database 206 may include suitable logic, circuitry, interfaces, and/or code, executable by the circuitry, that may be configured to store the instructions and/or code that enable the first and second processors 202 and 204 to execute their operations. In one embodiment, the local database 206 may be configured to store the sample data, the target data, the set of rules, and the predictor models. The local database 206 may be further configured to manage and store the sample images generated by the second processor 204. Examples of the local database 206 may include, but are not limited to, a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the local database 206 in the application server 106, as described herein. In another embodiment, the local database 206 may be realized in form of a cloud storage working in conjunction with the application server 106, without departing from the scope of the disclosure.

The communication interface 208 may include suitable logic, circuitry, interfaces, and/or code, executable by the circuitry, that may be configured to transmit and receive data to (or from) various entities, such as the test-user devices 104, the target-user device 112, and/or the external database server 108 over the communication network 114. Examples of the communication interface 208 may include, but are not limited to, an antenna, a radio frequency transceiver, a wireless transceiver, a Bluetooth transceiver, an Ethernet port, a universal serial bus (USB) port, or any other device configured to transmit and receive data. The communication interface 208 may be configured to communicate with the test-user devices 104, the target-user device 112, and the external database server 108 using various wired and wireless communication protocols, such as (TCP/IP), (UDP), LTE communication protocols, or any combination thereof.

Figure 3:
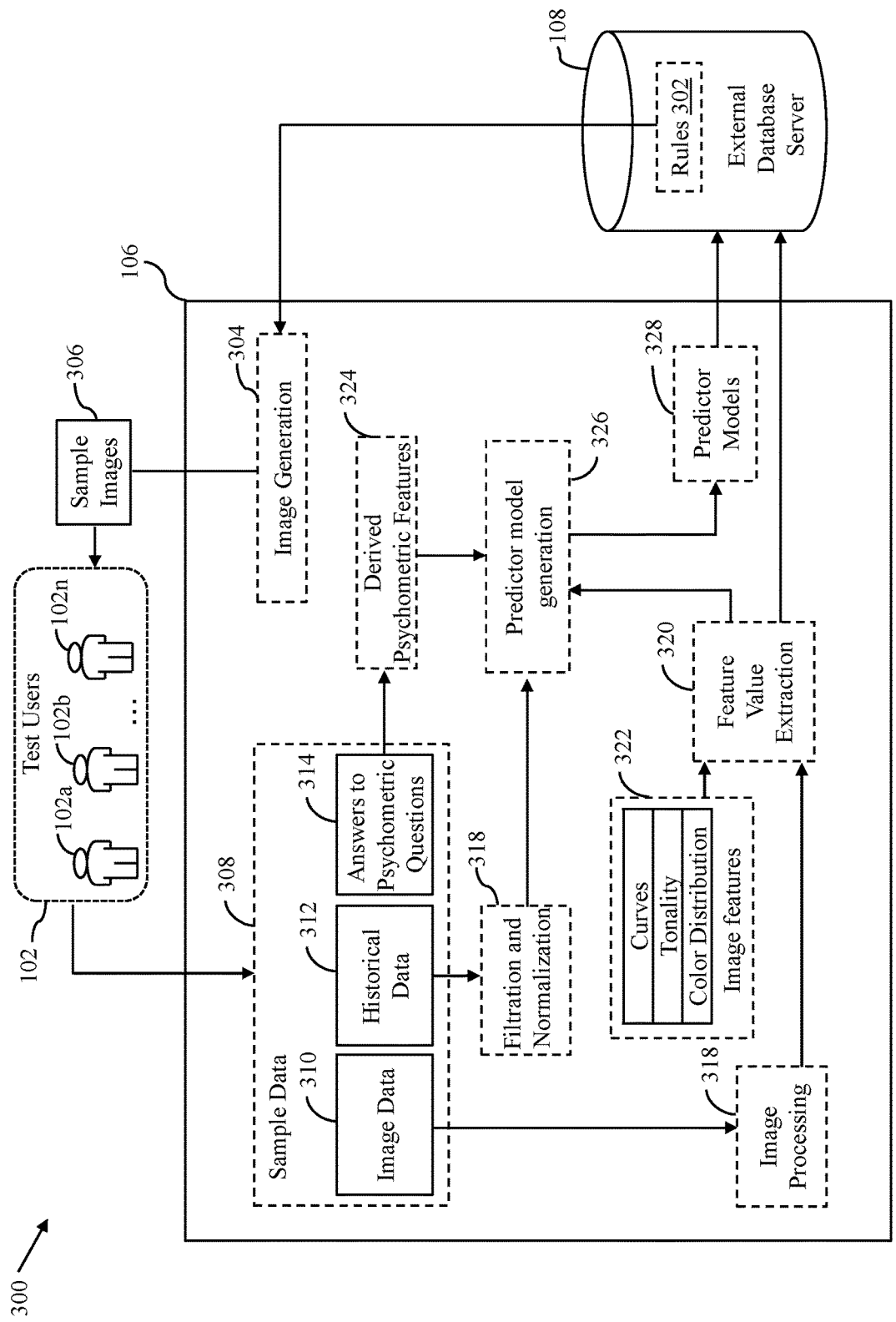
FIG. 3 is a block diagram that illustrates an exemplary scenario for generating predictor models, in accordance with an exemplary embodiment of the disclosure.

FIG. 3 is a block diagram that illustrates an exemplary scenario 300 for generating the predictor models, in accordance with an exemplary embodiment of the disclosure. The exemplary scenario 300 involves the test users 102, the application server 106, and the external database server 108. The application server 106 may be configured to utilize rules 302 stored in the external database server 108 and perform image generation operation (as shown by block 304) for generating sample images 306. The application server 106 may be configured to present the sample images 306 to the test users 102 on their test-user devices 104 for selection. The application server 106 may be further configured to retrieve sample data 308 from the test users 102 as a part of the learning phase. The sample data 308 may include image data 310 associated with the test users 102, historical data 312 of the test users 102, and answers 314 provided by the test users 102 to the psychometric questions. For the sake of simplicity, the retrieval of the sample data 308 is explained with respect to the test user 102*a*. However, it will be understood by a person of ordinary skill in the art that the application server 106 may be configured to retrieve the sample data 308 of the other test users 102*b*-102*n* in a similar manner as described for the test user 102*a*.

With reference to the test user 102*a*, the application server 106 may be configured to retrieve the image data 310 associated with the test user 102*a* through the test-user device 104*a*. The image data 310 may include various images that are liked by the test user 102*a* from the sample images 306. The application server 106 may be configured to generate the sample images 306 based on the rules 302. The rules 302 may include the first rule stating that the sample images 306 should include colored-blocks arranged in rows and columns. The rules 302 may further include the second rule stating that a combination of the colored-blocks chosen to form a sample image should represent a known emotional state, a known personality feature, or the like. Each image of the sample image 306 may include a corresponding unique pattern of colored-blocks. Before the sample images 306 may be presented to the test user 102*a*, the application server 106 may be configured to show an object, a label associated with an object, or an image having one or more objects in it, to the test user 102*a*. The test user 102*a* may select one or more sample images from the sample images 306 which the test-user 102*a* perceives to be related to the object or the label shown. The images selected by the test user 102*a* are may be included in the image data 310.

The historical data 312 of the test user 102*a* may include, but is not limited to, the curriculum information, the education particulars, the travel history, the employment details, the purchase history of the test user 102*a*, and one or more posts that are shared, followed, and liked by the test user 102*a* on the internet and the social media platform. For example, the test-user device 104*a*, executing the software application, may be configured to access the activity log of the test user 102*a* on the internet to obtain the travel history and the purchase history of the test user 102*a*. Based on a consent of the test user 102*a*, the test-user device 104*a* may be further configured to access the social media profile (for example LinkedIn®, Facebook®, or the like) of the test user 102*a* to obtain education and job particulars of the test user 102*a*, and one or more posts that are shared, followed, and liked by the test user 102*a* on the social media profile. The application server 106 may be further configured to communicate a questionnaire to the test-user device 104*a* regarding the historical data of the test user 102*a*. The test-user device 104*a* may be configured to communicate to the application server 106 a response provided by the test user 102*a* to the questionnaire and the application server 106 may be configured to the include the response of the test user 102*a* in the historical data 312.

The application server 106 may be configured to prompt the test user 102*a* to take one or more online or offline tests (such as, but not limited to, the multiple intelligence quiz, the BIG 5, or the personal globe inventory) including the psychometric questions. The test user 102*a* may provide the answers 314 to the psychometric questions. The answers 314 to the psychometric questions are then provided by the test user 102*a* and communicated to the application server 106 by the test-user device 104*a*. In one exemplary scenario, the psychometric questions may include one hundred questions each of which is associated with a linear scale. For example, the linear scale may be scored from 0 to 9, where score '0' means there is no correlation between the test user 102*a* and a question statement and score '9' means the test user 102*a* and the question statement completely correlate. In this scenario, the answer to each psychometric question may be a score selected by the test user 102*a* from the linear scale. In another exemplary scenario, the psychometric questions may include one hundred questions each of which is associated with a set of options, such as four options, having a specific score associated thereto. The test user 102*a* may be required to select one or more options from the set of options for each psychometric question as the answer. It will be apparent to a person of skill in the art that the abovementioned examples are for illustrative purpose and should not be construed to limit the scope of the disclosure. In another embodiment, the application server 106 may be further configured to retrieve the answers 314 from third-party servers (not shown) that conduct psychometric analysis of various users via online or offline tests.

In one embodiment, the application server 106 may be configured to modify the sample images 306 before presenting to the other test users 102*b*-102*n*. The application server 106 may be configured to modify the sample images 306 by altering the arrangement of the colored-blocks and retaining the unique patterns in each sample image 306. In another embodiment, the application server 106 may be configured to present, to the other test users 102b-102n, a combination of the sample images 306 presented to the test user 102a and the modified sample images.

After retrieving the sample data 308 of the test users 102, the application server 106 may be configured to process the sample data 308. Processing of the sample data 308 may involve filtering and normalizing the historical data 312 (as represented by block 316). For example, the historical data 312 retrieved from the test users 102 may include irrelevant information. Thus, the filtration and normalization module 214 may be configured to filter out and normalize the historical data 312 so that only relevant information is processed further. For example, the filtration and normalization module 214 may be configured to filter the commonly used words (such as "the", "is", "at", "which", "on", and the like) as irrelevant information from the historical data 312 and normalize the remaining historical data 312 to make it more meaningful. In another example, the filtration and normalization module 214 may be configured to parse specific keywords, such as, but not limited to, identifying a stream of numbers that may represent a mobile number, extracting keywords related to personality, job, likes, dislikes, or the like, in the historical data 312. In another example, the filtration and normalization module 214 may be configured to extract one or more named entities which are related to specific objects or actions (for example, identifying full name of an institution by recognizing informal name of the institution in a post) from the historical data 312 and recognize one or more activities which are mentioned indirectly (for example, recognizing a type of sport activity by referring a place description or a club name in a post) in the historical data 312.

Processing of the sample data 308 may further involve analyzing the image data 310. For analyzing each image in the image data 310, the feature extraction module 220 may be configured to perform image processing (as represented by block 318) followed by feature value extraction (as represented by block 320). Before analyzing the image data 310, the feature extraction module 220 may be configured to query the external database server 108 to identify images from the image data 310 that are already analyzed by the feature extraction module 220 during previous learning and prediction phases. The feature extraction module 220 may not analyze the already analyzed images for feature extraction and may query the external database server 108 to retrieve the feature values corresponding to the already analyzed images. In one scenario, the application server 106 may be configured to use the date and time markers of the images and/or the associated links for image processing and feature value extraction. In other words, the application server 106 may be configured to perform image processing and feature value extraction in a chronological order based on the date and time markers. For example, the application server 106 may be configured to process an image for which the test user 102a has shown interest one month ago before an image for which the test user 102a has shown interest one day ago. The image processing may involve resampling an image for magnification or minification (i.e. to modify a color scale associated with an image), removing duplicate copies of an image in the image data 310, pre-processing the image to convert it to a pixelated image (if required), denoising the image, and attaining a predefined resolution format (e.g. 128×128, 256×256, 1024×768 and the like).

During feature value extraction, the feature extraction module 220 may be configured to extract feature values from the images included in the image data 310 corresponding to image features (as represented by block 322) that may include, but are not limited to, color distribution, curves, and tonality. For example, extracting color distribution for a set of colors present in an image of the image data 310 may include resampling the image to modify a color space associated with the original image (i.e., the non-resampled image). As different color spaces, such as RGB, sRGB, CIELAB, and/or CIEXYZ, define different color scales (i.e., spatial and tonal resolutions), the feature extraction module 220 may be configured to normalize the colors present in the image to a particular color space having tone comparable scales, before extracting the color distribution from the image. In one scenario, a color scale of the re-sampled image may include multiple colors. In this scenario, the feature extraction module 220 may be configured to group a sub-set of colors and extract color distribution for the group of colors or individual colors associated with the group. In one embodiment, the feature extraction module 220 may be configured to determine a dominant color of the group of colors based on one or more parameters (e.g., number of pixels of the corresponding color in the image). In another scenario, the color scale of the re-sampled image may not include multiple colors. In this scenario, the feature extraction module 220 may be configured to extract distribution of a color that is nearest to the color present in the color space of the resampled image. Likewise, the feature extraction module 220 may be configured to extract feature values for other image features 322. It will be understood by a person of ordinary skill in the art that the block 322 is shown for illustrative purposes and should not be construed to limit the scope of the disclosure. In one embodiment, the feature extraction module 220 may be configured to combine the extracted feature values corresponding to the images of the image data 310. For example, the feature extraction module 220 may normalize and adjust the extracted feature values corresponding to the images of each test user 102 to obtain a specific set of feature values for each test user 102. The feature extraction module 220 may be further configured to store the extracted feature values corresponding to each image in the external database server 108.

Processing of the sample data 308 may further involve analyzing the answers 314 to derive psychometric features 324 of the test users 102. For the sake of ongoing description, the psychometric features are assumed to include, but are not limited to, personality attributes such as neuroticism, openness, conscientiousness, extraversion, agreeableness, realistic, investigative, artistic, social, enterprising, and conventional. The first processor 202 may be configured to analyze the answers 314 corresponding to each test user 102 for deriving psychometric features of the test user 102a. In an exemplary scenario, each of the psychometric features 324 may be associated with a corresponding range of a psychometric score. For example, neuroticism may be associated with the range [42,60] for the psychometric score that varies between [0,100]. When the psychometric score has the value between 42-60, neuroticism has a confidence score of '1'. The confidence score of neuroticism may decrease as the psychometric score deviates from the corresponding range. Likewise, the other psychometric features 324 may be associated with the corresponding range of the psychometric score. When the first processor 202 receives the answers 314, the first processor 202 may be configured to determine the psychometric score for the test user 102a. In one example, when the answers 314 provided by the test user 102a include a score selected by the test user 102a from the linear scale associated with each psychometric question, the psychometric score may be equal to a cumulative sum of the scores selected by the test user 102a. In another example, when the answers 314 provided by the test user 102a include one or more options selected by the test user 102a from the set of options associated with each psychometric question, the psychometric score may be equal to a cumulative sum of the scores associated with the options selected by the test user 102a. For deriving the psychometric features 324 of the test user 102a, the first processor 202 may be configured to determine the confidence score for each psychometric feature 324 based on the determined psychometric score of the test user 102a. It will be apparent to a person of skill in the art that the abovementioned exemplary scenario is for illustrative purpose and should not be construed to limit the scope of the disclosure. The first processor 202 may derive the psychometric features 324 based on the answers 314 by using by any technique known in the art.

After the sample data 308 is processed, the model generator 212 may be configured to use the analyzed historical data 312, the combined feature values extracted from the image data 310, and the derived psychometric features 324 as inputs for predictor model generation (as represented by block 326). The model generator 212 may use one or more machine learning algorithms, such as regression based predictive learning, neural networks based predictive leaning, and the like, for generating various predictor models (such as predictor models 328). During the generation of the predictor models 328, the model generator 212 may be configured to map the image features and the analyzed historical data 312 with the psychometric features based on the extracted feature values and generates links therebetween. In other words, a linear combination of image features is linked to each psychometric feature based on the extracted feature values. For example, in a linear regression model, for a first set of feature values extracted from the images that are selected by the test user 102a, the image features may be mapped to the confidence scores of each of the psychometric features 324 derived for the test user 102a. For a second set of feature values extracted from the images that are selected by the test user 102b, the image features may be mapped to the confidence scores of each of the psychometric features 324 derived for the test user 102b. Likewise, the analyzed historical data may be mapped with the psychometric features 324. The model generator 212 may be configured to assign weights to the generated links. The assigned weights indicate the strength of association between the specific image feature and the psychometric features 324. For example, the model generator 212 may assign a first set of weights to a first set of links between the image features and the psychometric features 324 derived for the test user 102a. In one scenario, when the second set of feature values extracted from the images that are selected by the test user 102b are same as the first set of feature values and the confidence scores of the psychometric features 324 derived for the test user 102b are same as of the user 102a, the model generator 212 may be configured to increase the first set of weights assigned to the first set of links. However, if the second set of feature values are different from the first set of feature values and/or the confidence scores of the psychometric features 324 derived for the test user 102b are not same as of the user 102a, the model generator 212 may be configured to adjust the first set of weights assigned to the first set of links and may generate a second set of links having a second set of weights between the image features and the psychometric features 324 derived for the test user 102b. Similarly, the model generator 212 may assign weights to the links generated between the image features and the psychometric features 324 derived for other test users 102c-102n. It will be apparent to a person of ordinary skill in the art that the abovementioned examples are for illustrative purpose, the model generator 212 may use other complex models of mapping the image features to the psychometric features 324 without deviating from the scope of the disclosure.

The model generator 212 may be further configured to map the unique pattern associated with the image data 310 with the psychometric features. For example, the model generator 212 may associate a first unique pattern with the first psychometric feature. The model generator 212 may be configured to generate the predictor models 328 by using the weighted links. The predictor models 322 generated by the model generator 212 may include at least three predictor models. The first predictor model may be capable of predicting psychometric features by using feature values extracted from an image as input. For example, the first predictor model may be capable of predicting psychometric features based on the color distribution of all the colors present in the images that may be selected by the target user 110 regardless of color grouping during the analysis of the images. In another example, the first predictor model may be capable of predicting the psychometric features of the target user 110 based on distribution of the group of colors (as represented by Kobayashi color distribution, or the like) in the selected images. In another example, the first predictor model may be capable of predicting the psychometric features of the target user 110 based on distribution a single dominant color in the images of the selected images. In another example, the first predictor model may be capable of predicting the psychometric features of the target user 110 based on curve-based features, perspective markers, and/or semantics presented as multidimensional vectors.

The second predictor model may be capable of predicting psychometric features by using analyzed historical data 312 as input. The third predictor model may capable of predicting business outcomes by using predicted and derived psychometric features, feature values extracted from one or more images as input. The model generator 212 may be configured to store the three predictor models 328 in the external database server 108. The predictor models 328 may be used by the prediction module 216 for predicting business outcomes, as described in conjunction with FIGS. 4-7.

Figure 4:
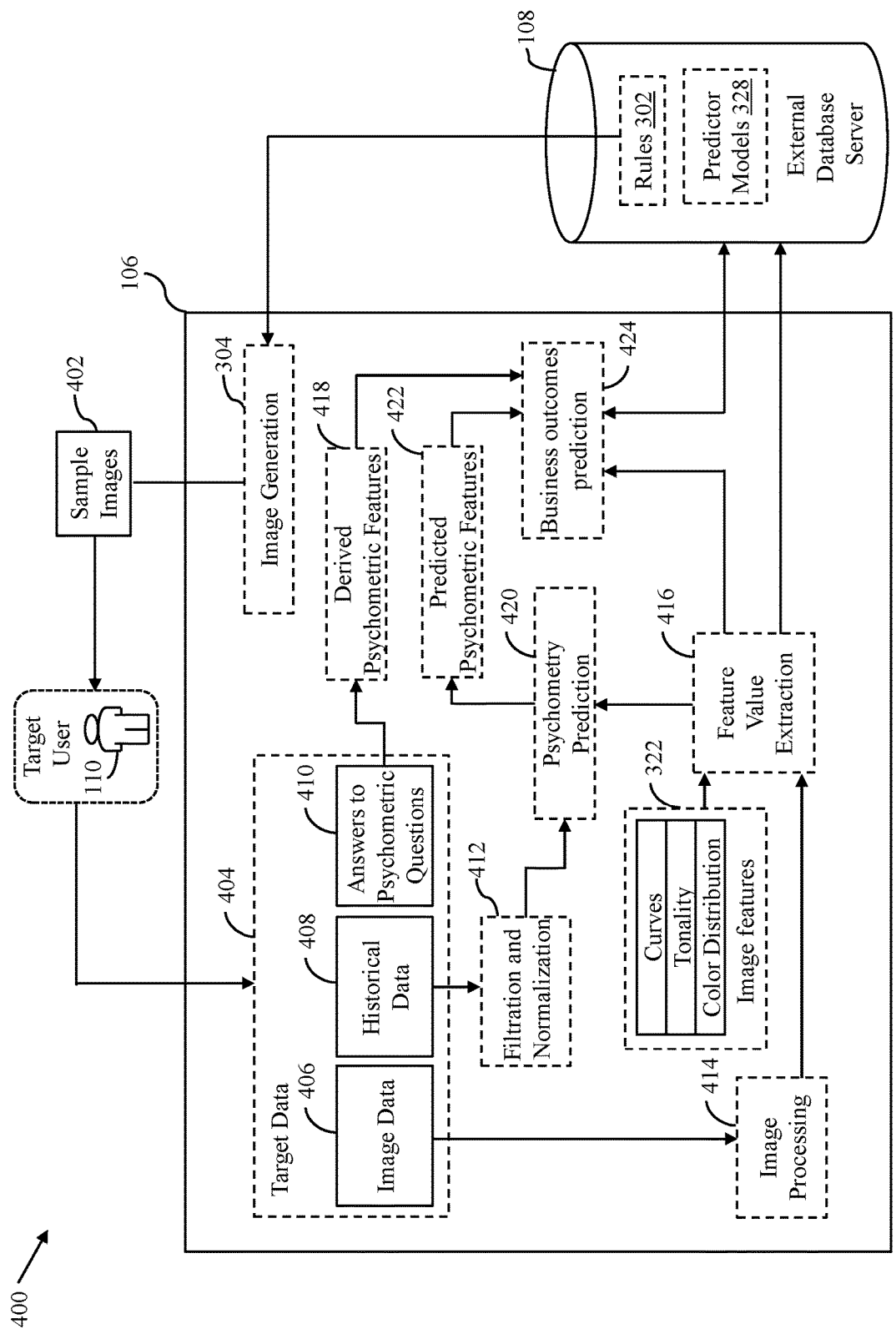
FIG. 4 is a block diagram that illustrates an exemplary scenario for predicting business outcomes, in accordance with an exemplary embodiment of the disclosure.

FIG. 4 is a block diagram that illustrates an exemplary scenario 400 for predicting business outcomes, in accordance with an exemplary embodiment of the disclosure. The exemplary scenario 400 involves the application server 106 that generates the sample images 402, the target user 110 who may provide target data 404, and the external database server 108 that may store the predictor models 328. The exemplary scenario 400 illustrates a scenario where the target data 404 may include image data 406 of the target user 110, historical data 408 of the target user 110, and answers 410 provided by the target user 110 to the psychometric questions.

The application server 106 may be configured to generate sample images 402 by referring to the rules 302 stored in the external database server 108. The sample images 402 may be generated, in a similar manner as described in FIG. 3. In one embodiment, the sample images 402 may be same as the sample images 306. In another embodiment, the sample images 402 may be modified versions of the sample images 306 and may include the unique patterns of the sample images 306. For example, the application server 106 may be configured to modify the sample images 306 by altering the arrangement of the colored-blocks and retaining the unique patterns in each sample image 306, to generate the sample images 402.

The application server 106 may be configured to present the sample images 402 to the target user 110 and retrieve the target data 404 through the target user device 112. When presented with the sample images 402, the target user 110 may select a set of sample images that target user 110 likes from the sample images 402. The set of sample images liked by the target user 110 are included in the image data 406. In one embodiment, before the sample images 402 are presented to the target user 110, the application server 106 may be configured to show an object, a label associated with an object, or an image having one or more objects in it, to the target user 110. The target user 110 may select one or more sample images from the sample images 402 which the target user 110 perceives to be related to the object or the label shown. The images liked by the target user are included in the image data 406.

The historical data 408 of the target user 110 may include, but is not limited to, the curriculum information, the education particulars, the travel history, the employment details, and/or the purchase history of the target user 110. For example, the target-user device 112 may be configured to access the activity log of the target user 110 on the internet for providing the travel history and the purchase history of the target user 110 to the application server 106. The target-user device 112 may be further configured to access the social media profile (for example LinkedIn®, Facebook®, and the like) of the target user 110 for providing the education and job particulars of the target user 110, and one or more posts that are shared, liked, or followed by the target user 110 on the social media profile to the application server 106. In one embodiment, the application server 106 may be configured to prompt the target user 110 by way of the target-user device 112 to provide additional historical data 408. The application server 106 may be further configured to communicate a questionnaire to the target user 110 regarding the historical data 408 of the target user 110 through the target-user device 112. The target-user device 112 may be configured to communicate to the application server 106 a response provided by the target user 110 to the questionnaire and the application server 106 may be configured to the include the response of the target user 110 in the historical data 408.

The application server 106 may be configured to prompt the target user 110 to take one or more online or offline tests (such as, but not limited to, the multiple intelligence quiz, the BIG 5, or the personal globe inventory) including the psychometric questions. The target user 110 may provide the answers 410 to the psychometric questions. In another embodiment, the application server 106 may be further configured to retrieve the answers 410 from the third-party servers that conduct the psychometry analysis of users via online or offline tests. The answers 410 may be similar to the answers 314.

After retrieving the target data 404, the application server 106 may be configured to process the target data 404. Processing of the target data 404 may involve filtering and normalizing the historical data 408 (as represented by block 412). Processing of the target data 404 may further involve analyzing the image data 406. Before analyzing the image data 406, the feature extraction module 220 may query the external database server 108 to identify images in the image data 406 that are already analyzed by the feature extraction module 220 during the learning phase. The feature extraction module 220 may not analyze the already analyzed images for feature extraction and may query the external database server 108 to retrieve the feature values corresponding to the already analyzed sample images. For analyzing the sample images in the image data 406 that have not been analyzed during the learning phase, the feature extraction module 220 may perform image processing (as represented by block 414) followed by feature value extraction (as represented by block 416). The second processor 204 may be configured to perform image processing and feature value extraction on the retrieved images if they are not analyzed previously. During feature value extraction, the feature extraction module 220 may be configured to extract the feature values from the sample images included in the image data 406 corresponding to the image features (as represented by block 322). The image features may include, but are not limited to, color distribution, curves, and/or tonality. In one embodiment, the extracted feature values may correspond to a multidimension vector.

In an exemplary scenario, extracting color distribution for a set of colors present in an image of the image data 406 may include resampling the image to modify a color space associated with the original image (i.e., the non-resampled image). As different color spaces, such as RGB, sRGB, CIELAB, and/or CIEXYZ, define different color scales (i.e., spatial and tonal resolutions), the feature extraction module 220 may be configured to normalize the colors present in the image to a particular color space having tone comparable scales, before extracting the color distribution from the image. In one scenario, a color scale of the re-sampled image may include multiple colors. In this scenario, the feature extraction module 220 may be configured to group a sub-set of colors and extract color distribution for the group of colors or individual colors associated with the group. In one embodiment, the feature extraction module 220 may be configured to determine a dominant color of the group of colors based on one or more parameters (e.g., number of pixels of the corresponding color in the image). In another scenario, the color scale of the re-sampled image may not include multiple colors. In this scenario, the feature extraction module 220 may be configured to extract distribution of a color that is nearest to the color present in the color space of the resampled image. Likewise, the feature extraction module 220 may be configured to extract feature values for other image features 322. In one embodiment, the feature extraction module 220 may normalize and adjust the extracted feature values corresponding to the images of the target user 110 to obtain a combined set of feature values for the target user 110.

The feature extraction module 220 may be configured to store the extracted feature values corresponding to each sample image in the external database server 108. Processing of the target data 404 may further involve analyzing the answers 410 by the first processor 202 for deriving psychometric features 418 (hereinafter designated and referred to as "derived psychometric features 418") of the target user 110.

After the target data 404 is processed, the prediction module 216 may be configured to query the external database server 108 to retrieve the predictor models 328. The prediction module 216 may be further configured to use the feature values extracted from the image data 406, the unique patterns included in the sample images of the image data, and analyzed historical data 408 as input to the first and second predictor models, respectively, for psychometry prediction (as represented by block 420). The prediction module 216 may be further configured to use the analyzed historical data 408 as input to the second predictor model for psychometry prediction (as represented by block 420). The psychometry prediction may yield predicted psychometric features 422 of the target user 110 as output. In one embodiment, the prediction module 216 may be configured to predict psychometric features separately for each sample image in the image data 406 by using the first predictor model. After the psychometric features are predicted for each image of the image data 406, the prediction module 216 may be configured to normalize and adjust the psychometric features to yield the predicted psychometric features 422. In another embodiment, the prediction module 216 may be configured to normalize and combine the feature values extracted from the images of the image data 406 and use the normalized and combined feature values as input to the first predictor model for obtaining the predicted psychometric features 422.

The prediction module 216 may be configured to use the combined feature values extracted from the image data 406, the unique patterns included in the sample images of the image data 406, and combined psychometric features (i.e., the derived psychometric features 418 and the predicted psychometric features 422) as input to the third predictor model for predicting business outcomes (as represented by block 424). The application server 106 may be configured to store the predicted business outcomes in the external database server 108. In an embodiment, the business outcomes may include, but are not limited to, job suggestions, purchase suggestions, targeted advertisements, image suggestions, compatibility match, and the like. Due to chronological processing of the image data 406 based on the date and time markers, the application server 106 may be capable of predicting the business outcomes as per behavioral changes exhibited by the target user 110 over a period of time. The application server 106 may be configured to communicate the predicted business outcomes to the target user 110. Thus, based on the predicted business outcomes, intelligent and informed decisions (such as accepting or denying a job offer, purchasing a new product, listening suggested music files, and the like) may be made by the target user 110. In another embodiment, the business outcomes may include, but are not limited to, purchase trend of various commodities, affinity of the target user 110 for one or more activities, and the like. The application server 106 may communicate the predicted business outcomes to an organization, such as a social media provider, an e-commerce provider, or the like. Thus, based on the predicted business outcomes, intelligent and informed decisions (such as providing relevant job suggestions to the target user 110 on the social media profile of the target user 110 or customizing the social media profile of the target user 110 based on the interests of the target user 110) may be made by the social media provider. Likewise, based on the predicted business outcomes, an e-commerce platform may make intelligent decisions, such as updating their inventory based on the purchase trend. The e-commerce platform may divide customers into different groups based on their common purchase interests (i.e., business outcomes). Moreover, deep personalization of a customer (i.e., analyzing image interests of the customer) to understand more complex patterns of customer behavior (i.e., business outcomes) and preferences may help the e-commerce platform to grow. Similarly, an educational institute, such as a university, may use the predicted business outcomes to offer admission to various students or understand requirement of new equipment, stationery to be installed.

In another exemplary scenario, the target user 110 may be a person to be hired by an organization. In this scenario, the organization may obtain and analyze image samples, that are of interest to the target user 110, by using the predictor models 328 to get accurate prediction of personality of the target user 110, without asking any question to the target user. In another exemplary scenario, the target user 110 may be an employee of the organization, whose employment affinity (i.e., a business outcome) is of interest to the organization, such as for employee retention and engagement.

It will be understood by a person of ordinary skill in the art that the abovementioned business outcomes are listed for exemplary purpose and should not be construed to limit the scope of the disclosure. In other embodiments, the predictor models 328 may be utilized to predict business outcomes that are different from the business outcomes mentioned above.

In one embodiment, the application server 106 may be configured to render a user interface (UI) on the target-user device 112 for presenting the predicted business outcomes to the target user 110. In one example, the application server 106 may be configured to render the UI through the software application that runs on the target-user device 112. A feedback (for example, a common score or an individual score for each business outcome) may be provided by the target user 110 to indicate a relevance of the predicted business outcomes. For example, when the business outcomes have high relevance to the target user 110, the target user 110 may provide a positive feedback. In another example, when the business outcomes have low relevance to the target user 110, the target user 110 may provide a negative feedback. The model generator 212 may be configured to use the feedback provided by the target user 110 to update the predictor models 328 for improving their accuracy. The model generator 212 may be further configured to adjust the weight of links between the image features, the unique patterns, and the psychometric features (e.g. the personality attributes) based on the feedback.

Figure 5:
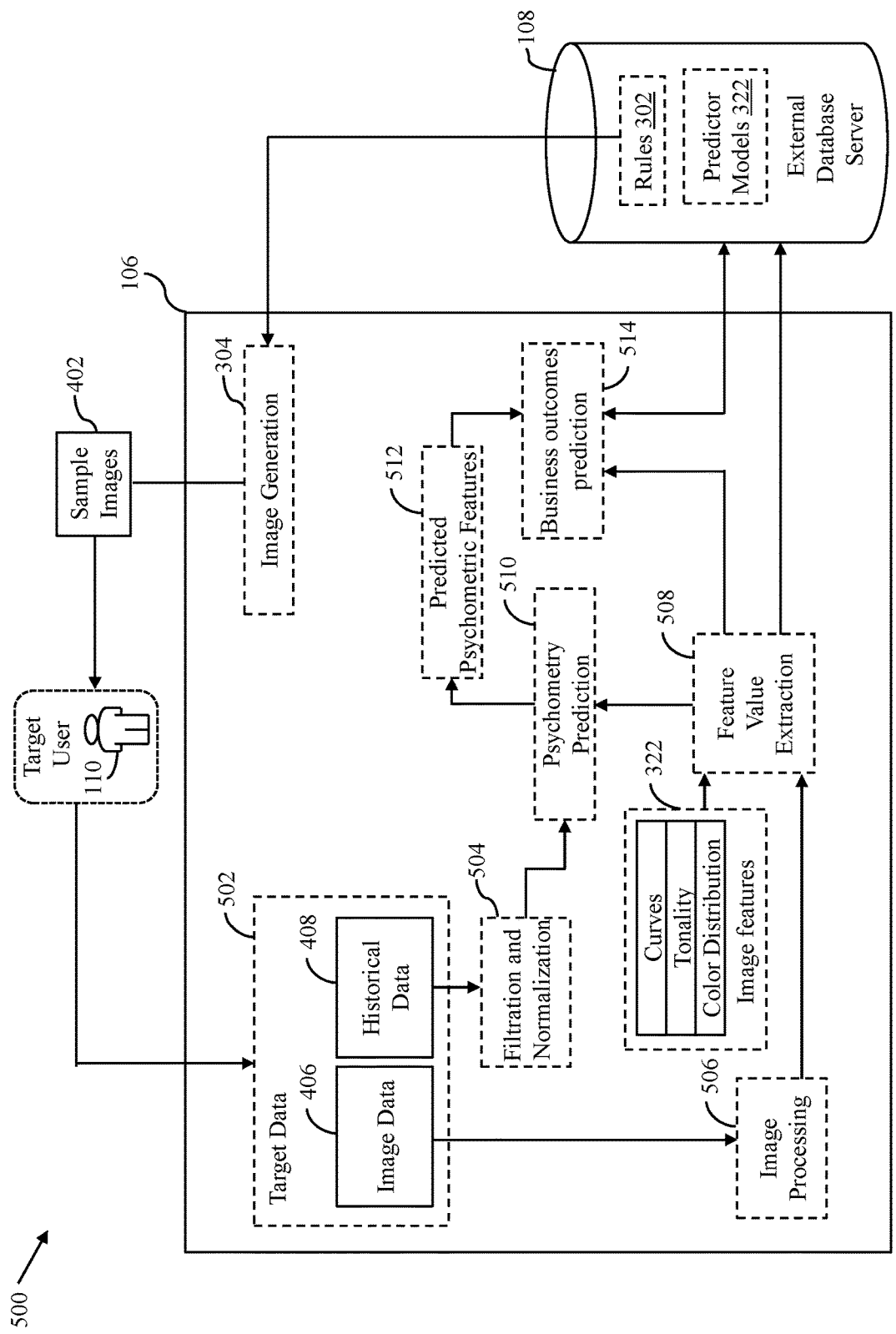
FIG. 5 is a block diagram that illustrates another exemplary scenario for predicting business outcomes, in accordance with another exemplary embodiment of the disclosure.

FIG. 5 is a block diagram that illustrates another exemplary scenario 500 for predicting business outcomes, in accordance with another exemplary embodiment of the disclosure. The exemplary scenario 500 involves the target user 110 who may provide target data 502, the application server 106, and the external database server 108 that may store the predictor models 328. The exemplary scenario 500 illustrates a scenario where the target data 502 may include the image data 406 of the target user 110 and the historical data 408 of the target user 110. The application server 106 may be configured to retrieve the target data 502 in a manner similar to the retrieval of the target data 404 as explained in FIG. 4.

After retrieving the target data 502, the application server 106 may be configured to process the target data 502. The filtration and normalization module 214 may be configured to filter and normalize the historical data 408 (as represented by block 504). Before analyzing the image data 406, the feature extraction module 220 may be configured to query the external database server 108 to identify sample images in the image data 406 that are already analyzed by the feature extraction module 220 during previous learning or prediction phases. The feature extraction module 220 may not analyze the already analyzed images for feature extraction and may query the external database server 108 to retrieve the feature values corresponding to the already analyzed sample images. The feature extraction module 220 may be configured to perform image processing (as represented by block 506) followed by feature value extraction (as represented by block 508) on the images that are not analyzed yet. During feature value extraction, the feature extraction module 220 may be configured to extract the feature values corresponding to the image features (as represented by block 322). The feature extraction module 220 may be further configured to store the extracted feature values corresponding to each sample image in the external database server 108. Since the target data 502 may not include the answers 410 to the psychometric questions, the first processor 202 may not be configured to derive any psychometric features of the target user 110 based on the answers 410.

After the target data 502 is processed, the prediction module 216 may be configured to query the external database server 108 to retrieve the predictor models 328. The prediction module 216 may be configured to use the feature values extracted from the image data 406, the analyzed historical data 408 as input to and the unique patterns included in the sample images of the image data 406 as input to the first and second predictor models for psychometry prediction (as represented by block 510). The psychometry prediction may yield predicted psychometric features 512 as output.

The prediction module 216 may be configured to use the feature values extracted from the image data 406, the unique patterns included in the sample images of the image data 406, and the predicted psychometric features 512 as input to the third predictor model for predicting the business outcomes (as represented by block 514). The predicted business outcomes may be relevant to the target user 110 and/or an organization as described in FIG. 4. The application server 106 may be configured to store the predicted business outcomes in the external database server 108.

Figure 6:
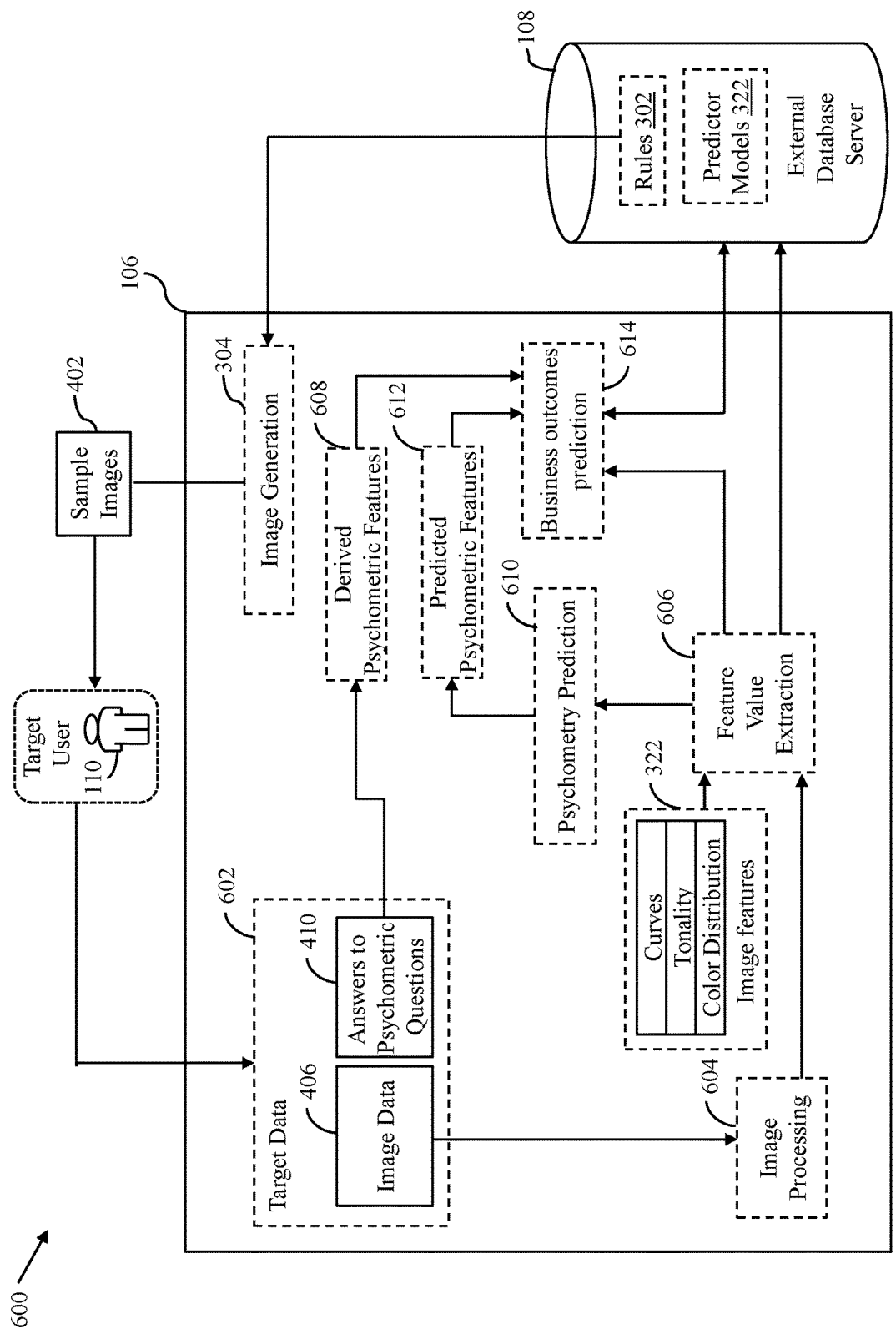
FIG. 6 is a block diagram that illustrates another exemplary scenario for predicting business outcomes, in accordance with another exemplary embodiment of the disclosure.

FIG. 6 is a block diagram that illustrates an exemplary scenario 600 for predicting business outcomes, in accordance with another exemplary embodiment of the disclosure. The exemplary scenario 600 involves the target user 110 who may provide target data 602, the application server 106, and the external database server 108 that may store the predictor models 328. The exemplary scenario 600 illustrates a scenario where the target data 602 may include the image data 406 of the target user 110 and the answers 410 provided by the target user 110 to the psychometric questions. The application server 106 may be configured to retrieve the target data 602 in a manner similar to the retrieval of the target data 404 as explained in FIG. 4.

After retrieving the target data 602, the application server 106 may be configured to process the target data 602. Before analyzing the image data 406, the feature extraction module 220 may be configured to query the external database server 108 to identify images in the image data 406 that are already analyzed by the feature extraction module 220 during the previous learning or prediction phases. The feature extraction module 220 may not analyze the already analyzed images for feature extraction and may query the external database server 108 to retrieve the feature values corresponding to the already analyzed images. The feature extraction module 220 may be configured to perform image processing (as represented by block 604) followed by feature value extraction (as represented by block 606) on the images that are not analyzed yet. During feature value extraction, the feature extraction module 220 may be configured to extract the feature values corresponding to the image features (as represented by block 322). The feature extraction module 220 may be further configured to store the extracted feature values corresponding to each image in the external database server 108. Processing of the target data 602 may further involve analyzing the answers 410 by the first processor 202 for deriving psychometric features 608 (hereinafter designated and referred to as "derived psychometric features 608") of the target user 110.

After the target data 602 is processed, the prediction module 216 may be configured to query the external database server 108 to retrieve the predictor models 328. The prediction module 216 may be further configured to use the feature values extracted from the image data 406 and the unique patterns included in the sample images of the image data 406 as input to the first predictor model for psychometry prediction (as represented by block 610). The psychometry prediction may yield predicted psychometric features 612 as output.

The prediction module 216 may be further configured to use the feature values extracted from the image data 406, the unique patterns included in the sample images of the image data 406, combined psychometric features (i.e., the derived psychometric features 608, and the predicted psychometric features 612) as input to the third predictor model for predicting the business outcomes (as represented by block 614). The predicted business outcomes may be relevant to the target user 110 and/or an organization as described in FIG. 4. The application server 106 may be configured to store the predicted business outcomes in the external database server 108.

Figure 7:
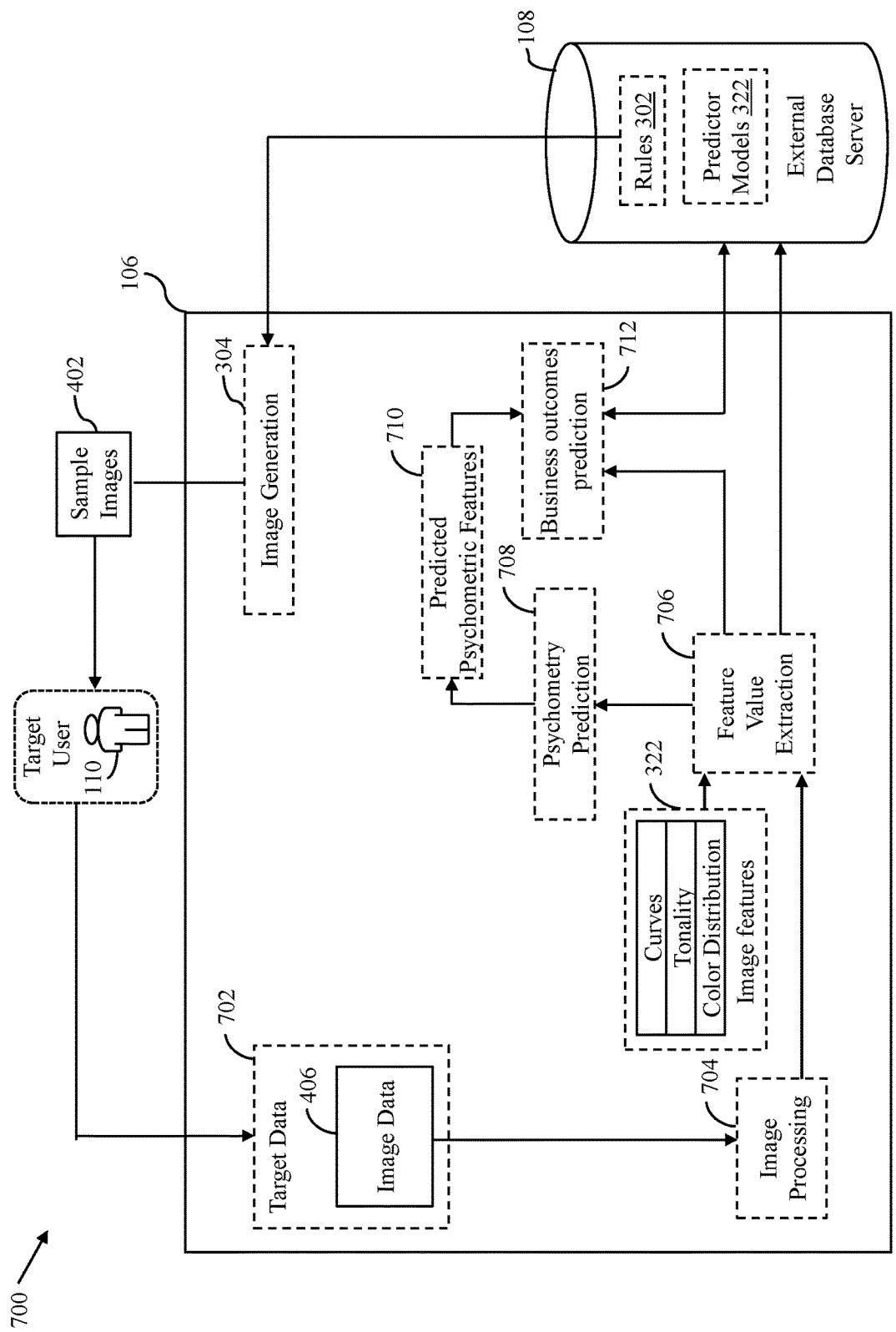
FIG. 7 is a block diagram that illustrates another exemplary scenario for predicting business outcomes, in accordance with another exemplary embodiment of the disclosure.

FIG. 7 is a block diagram that illustrates an exemplary scenario 700 for predicting business outcomes, in accordance with another exemplary embodiment of the disclosure. The exemplary scenario 700 involves the target user 110 who may provide target data 702, the application server 106, and the external database server 108 that may store the predictor models 328. The exemplary scenario 700 illustrates a scenario where the target data 702 may include only the image data 406 of the target user 110. The application server 106 may be configured to retrieve the target data 702 in a manner similar to the retrieval of the target data 404 as explained in FIG. 4.

After retrieving the target data 702, the application server 106 may be configured to process the target data 702. Before analyzing the image data 406, the feature extraction module 220 may be configured to query the external database server 108 to identify sample images in the image data 406 that are already analyzed by the feature extraction module 220 during the previous learning and prediction phases. The feature extraction module 220 may be configured to perform image processing (as represented by block 704) followed by feature value extraction (as represented by block 706) on the images in the image data 406 that are not analyzed yet. During feature value extraction, the feature extraction module 220 may be configured to extract the feature values corresponding to the image features (as represented by block 322). The feature extraction module 220 may be further configured to store the extracted feature values corresponding to each image in the external database server 108. Since the target data 702 may not include the answers 410 to the psychometric questions, the first processor 202 may not derive any psychometric features of the target user 110 based on the answers 410.

After the target data 702 is processed, the prediction module 216 may be configured to query the external database server 108 to retrieve the predictor models 328. The prediction module 216 may be further configured to use the feature values extracted from the image data 406 and the unique patterns included in the sample images of the image data 406 as input to the first predictor model for psychometry prediction (as represented by block 708). The psychometry prediction may yield predicted psychometric features 710 as output. The prediction module 216 may be configured to use the feature values extracted from the image data 406, the unique patterns included in the sample images of the image data 406, and the predicted psychometric features 710 as input to the third predictor model for predicting the business outcomes (as represented by block 712). The predicted business outcomes may be relevant to the target user 110 and/or an organization as described in FIG. 4. The application server 106 may be configured to store the predicted business outcomes in the external database server 108.

Figure 8A:
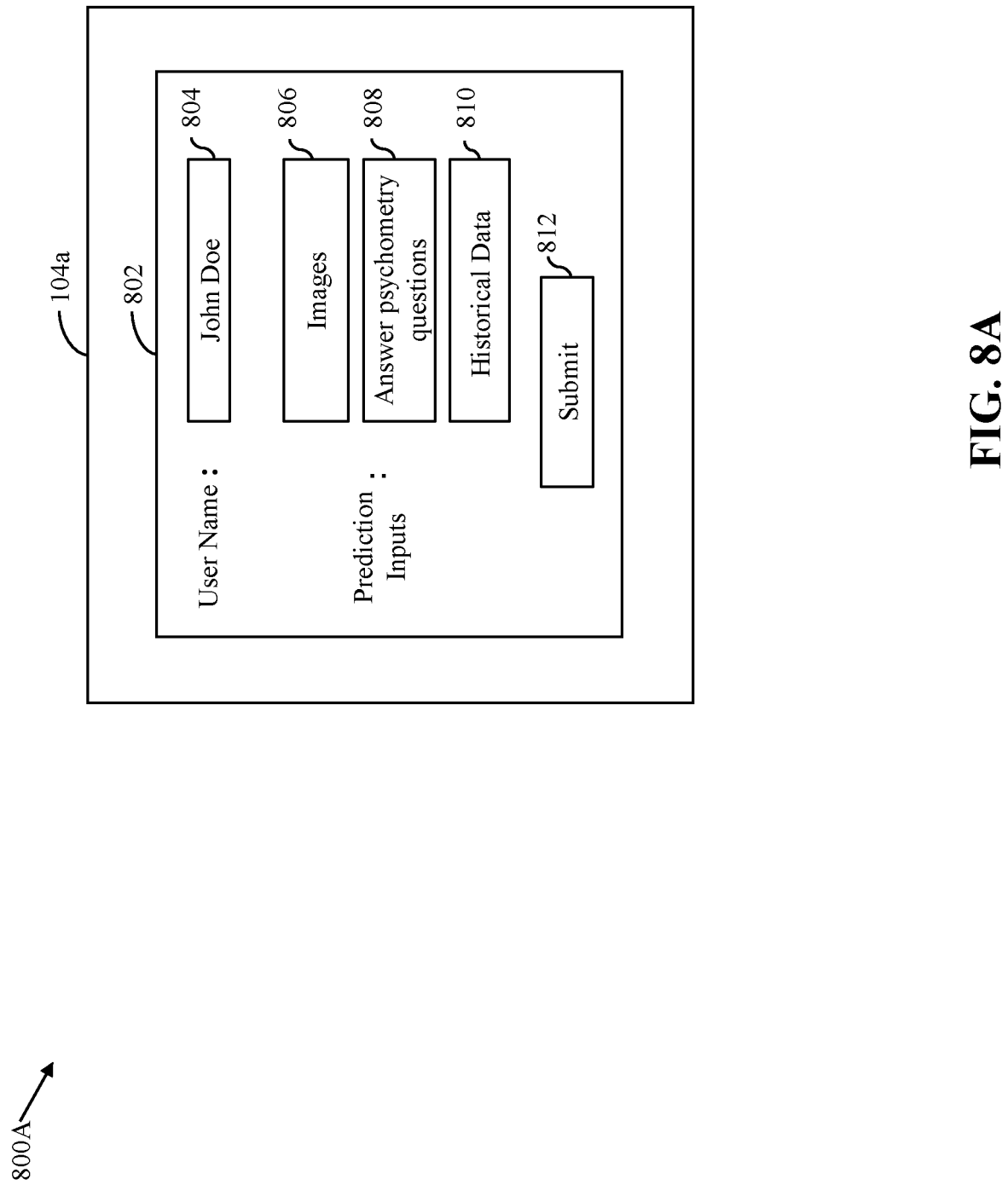
FIG. 8A is a block diagram that illustrates an exemplary user interface (UI) rendered on a test-user device by the application server for receiving sample data of a test user, in accordance with an embodiment of the disclosure.

FIG. 8A is a block diagram 800A that illustrates an exemplary UI 802 rendered on the test-user device 104a by the application server 106 for retrieving the sample data 308 of the test user 102a, in accordance with an embodiment of the disclosure. The UI 802 may include a first input box 804, where a name is to be entered by the test user 102a (for example, "John Doe"). The UI 802 may further include first through third options 806-810 pertaining to inputs (i.e., the sample data 308) required from the test user 102a. The first through third options 806-810 may be selectable by the test user 102a. If the first option 806 is selected by the test user 102a, the application server 106 may be configured to present the sample images 306 to the test user 102a and retrieve the sample images (i.e., the image data 310) selected by the test user 102a. If the second option 808 is selected by the test user 102a, the application server 106 may be configured to retrieve the answers 314 provided by the test user 102a to the psychometric questions. If the third option 810 is selected by the test user 102a, the application server 106 may be configured to retrieve the historical data 312 of the test user 102a. The retrieval of the image data 310, the answers 314 provided by the test user 102a to the psychometric questions, and the historical data 312 has been described in FIG. 3. The UI 802 may further include a first submit button 812, which may be selected by the test user 102a to submit the sample data 308 to the application server 106.

It will be apparent to a person of ordinary skill in the art that the UI 802 is shown for illustrative purposes and should not be construed to limit the scope of the disclosure. In another embodiment, the application server 106 may render the UI 802 on the target-user device 112 for retrieving the target data (such as the target data 404, 502, 602, or 702) of the target user 110. The target user 110 may have an option to select any of the second and third options 808 and 810 whereas the first option 806 may be selected by default. The application server 106 may be configured to retrieve the target data (as described in FIGS. 4-7) based on the selection performed by the target user 110. For example, if the second option 808 is not selected by the target user 110 and the third option 810 is selected by the target user 110, the application server 106 may be configured to retrieve only the image data 406 and the historical data 408 of the target user 110.

Figure 8B:
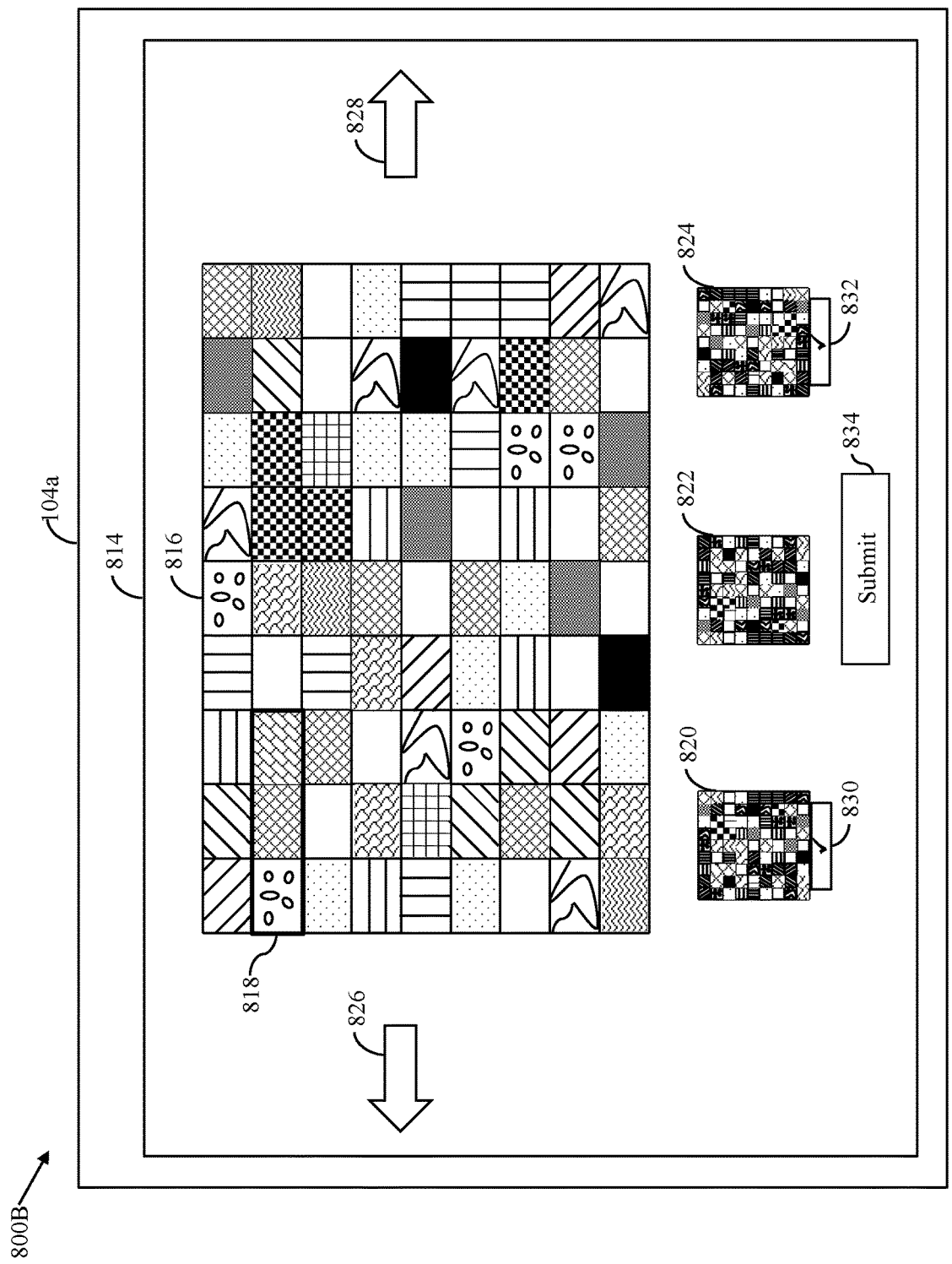
FIG. 8B is a block diagram that illustrates an exemplary UI rendered on the test-user device by the application server for presenting sample images, in accordance with an embodiment of the disclosure.

FIG. 8B is a block diagram 800B that illustrates an exemplary UI 814 rendered on the test-user device 104a by the application server 106 for presenting the sample images 306 to the test user 102a, in accordance with an embodiment of the disclosure. The UI 814 may be rendered on the test-user device 104a when the first option 806 presented on the UI 802 is selected by the test user 102a.

The UI 814 may display the sample images 306 to the test user 102a for selection. For example, a first sample image 816 from the sample images 306 may be displayed on the UI 814. In this scenario, the first sample image 816 is currently being viewed by the test user 102a. As illustrated, the first sample image 816 may be formed by multiple colored-blocks that are arranged in rows and columns. For the sake of illustration, each colored-block may be represented by a rectangular block having a black and white pattern. Two rectangular blocks that have same pattern may represent colored-blocks having same color. The first sample image 816 may include a corresponding unique pattern 818 formed by adjacent colored-blocks. The UI 814 may further display other images 820, 822, and 824 in the sample images 306, which are not currently viewed by the test user 102a.

The test user 102a may navigate between the sample images 306 using scroll buttons 826 and 828. By clicking or otherwise activating the scroll button 826 (i.e., a backward-arrow), the test user 102a may navigate to a previous image in the sample images 306. By clicking or otherwise activating the scroll button 828 (i.e., a forward-arrow), the test user 102a may navigate to a next image in the sample images 306. The UI 814 may further include various selection indicators to indicate selection statuses of the sample images 306. For example, the UI 814 may include selection indicators 830 and 832 indicating that the test user 102a may have already selected the images 820 and 824 from the sample images 306. After the test user 102a has selected the sample images, the test user 102a may submit the selected sample images to the application server 106 by clicking or otherwise activating a second submit button 834.

It will be apparent to a person of ordinary skill in the art that the UI 814 is shown for illustrative purposes and should not be construed to limit the scope of the disclosure. In another embodiment, the application server 106 may render the UI 814 on the target-user device 112 of the target user 110 to present the sample images 402 to the target user 110 for selection as described in FIGS. 4-7.

Figure 8C:
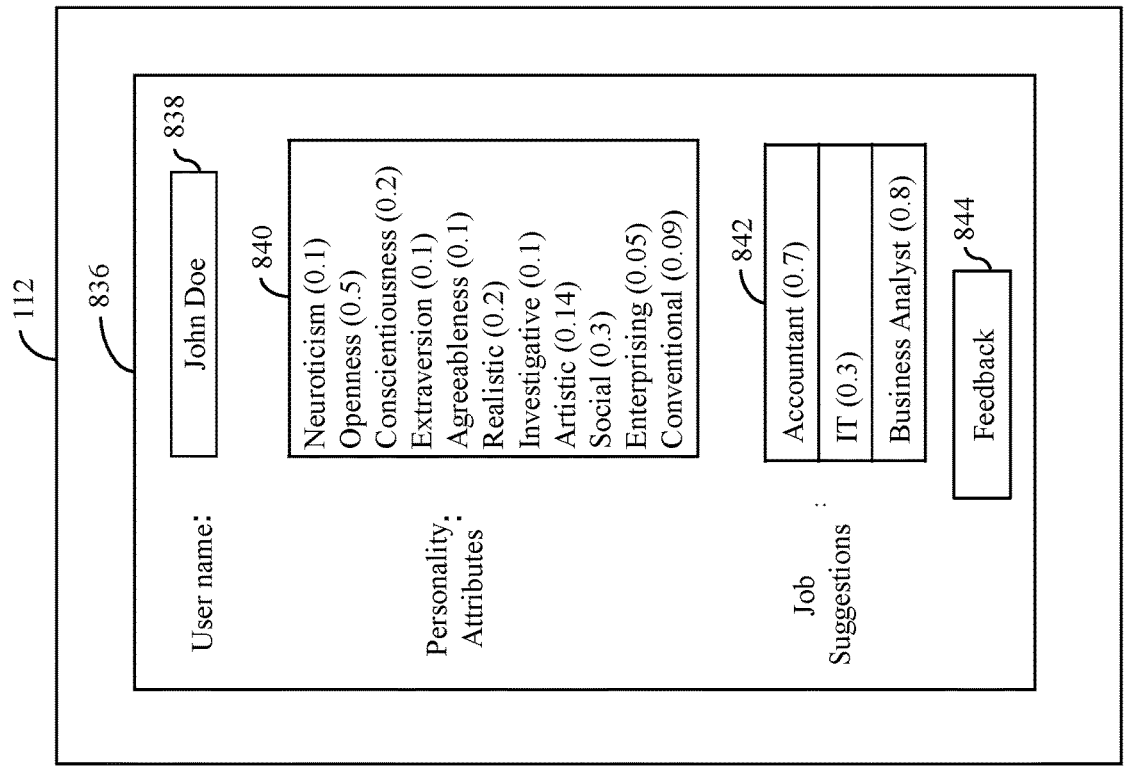
FIG. 8C is a block diagram that illustrates an exemplary UI rendered on a target-user device by the application server for presenting predicted business outcomes, in accordance with an embodiment of the disclosure.

FIG. 8C is a block diagram 800C that illustrates an exemplary UI 836 rendered on the target-user device 112 by the application server 106 for presenting predicted business outcomes, in accordance with an embodiment of the disclosure. The UI 836 may include a first field 838, where the name of the target user 110 may be displayed (for example, "John Doe"). The UI 836 may further include a first table 840 that may display personality attributes of the target user 110 and corresponding confidence scores. For example, the personality attributes of the target user 110 may be neuroticism, openness, conscientiousness, extraversion, agreeableness, realistic, investigative, artistic, social, enterprising, and conventional attributes having the confidence scores as 0.1, 0.5, 0.2, 0.1, 0.1, 0.2, 0.1, 0.14, 0.3, 0.05, and 0.09, respectively. The UI 836 may further include a second table 842 that may display various job suggestions (such as Accountant, IT, and Business analyst) for the target user 110. Likewise, the UI 836 may include additional tables (not shown) that may display relevant business outcomes, such as product purchase suggestions, travel suggestions, and the like, to the target user 110. The UI 836 may further include a first feedback button 844. The target user 110 may select the first feedback button 844 for providing a feedback, such as a score for each business outcome or a collective score, to the application server 106 indicating the relevance of the predicted business outcomes displayed in the second table 842 as a common or individual score per business outcome.

Figure 8D:
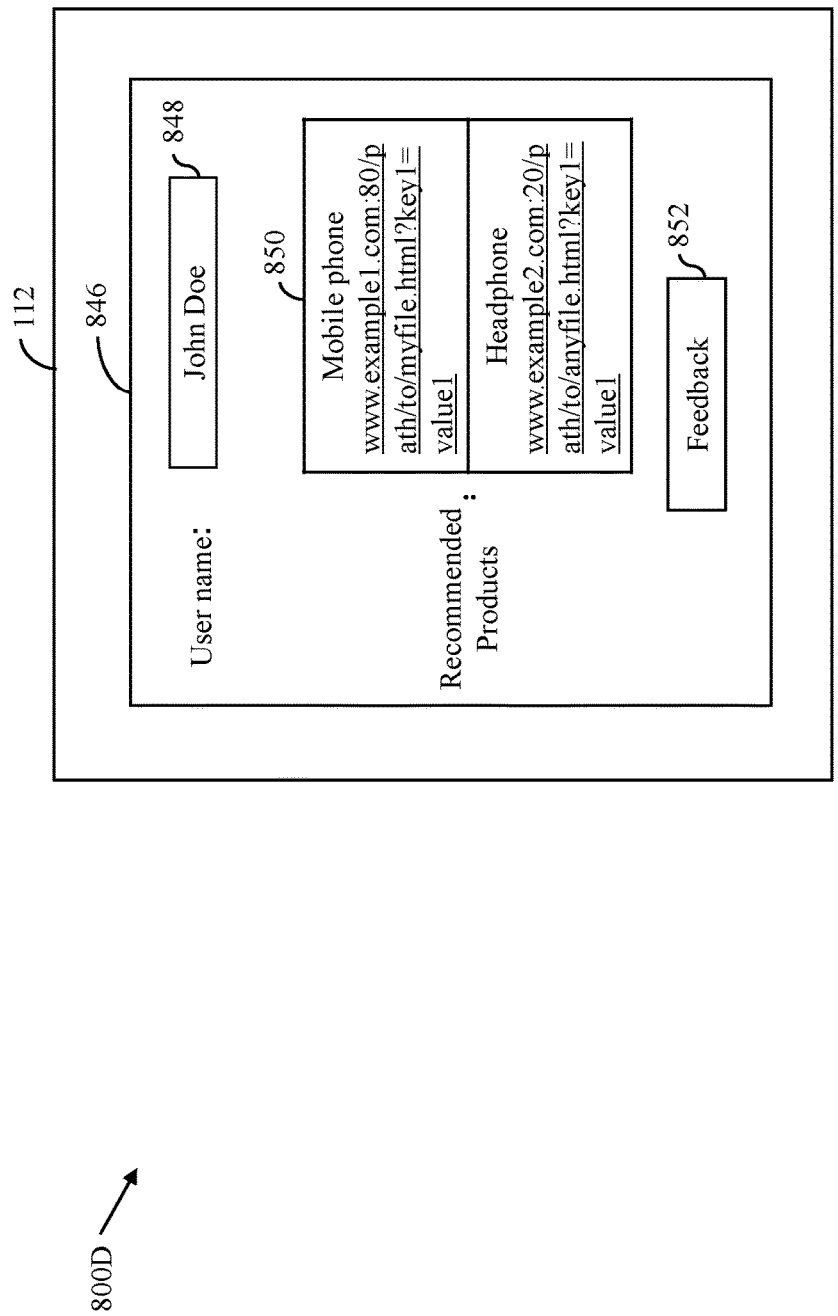
FIG. 8D is a block diagram that illustrates an exemplary UI rendered on the target-user device by the application server for presenting relevant products, in accordance with an embodiment of the disclosure.

FIG. 8D is a block diagram 800D that illustrates an exemplary UI 846 rendered on the target-user device 112 by the application server 106 for presenting product, in accordance with another embodiment of the disclosure.

The UI 846 may include a second field 848, where the name of the target user 110 may be displayed (for example, "John Doe"). The UI 846 may further include a third table 850 that displays relevant products buying insights. The UI 846 may further include a second feedback button 852. The target user 110 may select the second feedback button 852 for providing a feedback to the application server 106 indicating the relevance of the products displayed in the third table 850. It will be apparent to a person of ordinary skill in the art that the UIs 836 and 846 are shown for illustrative purposes and should not be construed to limit the scope of the disclosure.

Figure 9A:
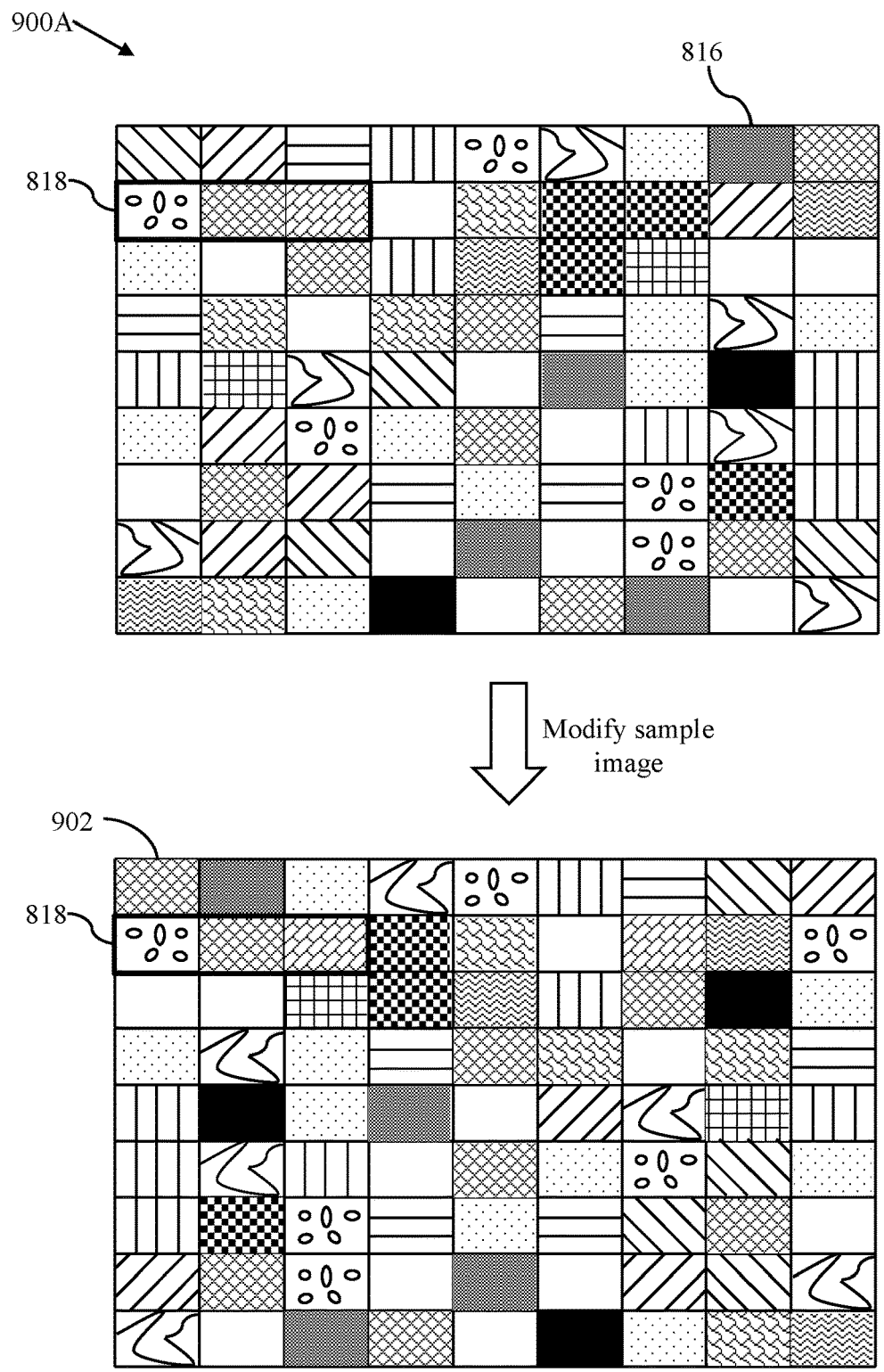
FIG. 9A is a block diagram that illustrates an exemplary sample image and an exemplary modified sample image, in accordance with an embodiment of the disclosure.

FIG. 9A is a block diagram 900A that illustrates an exemplary sample image and an exemplary modified sample image, in accordance with an embodiment of the disclosure. The application server 106 may be configured to modify the sample images 306 to generate new sample images for presenting to a new user (such as the test user 102b or the target user 110). The application server 106 may be configured to generate the modified sample images without altering the position of the colored-blocks associated with the unique pattern, such that the unique pattern and the psychometric features associated with each sample image 306 are retained in the modified sample images. For example, as shown in FIG. 9A, the sample image 816 having the unique pattern 818 is modified by the application server 106 to generate a modified sample image 902. The position of the unique pattern 818 in the modified sample image 902 is same as the position of the unique pattern 818 in the sample image 816. In an exemplary scenario, the application server 106 may be configured to modify color tones of colored-blocks other than the unique pattern 818 to generate the modified sample image 902.

Figure 9B:
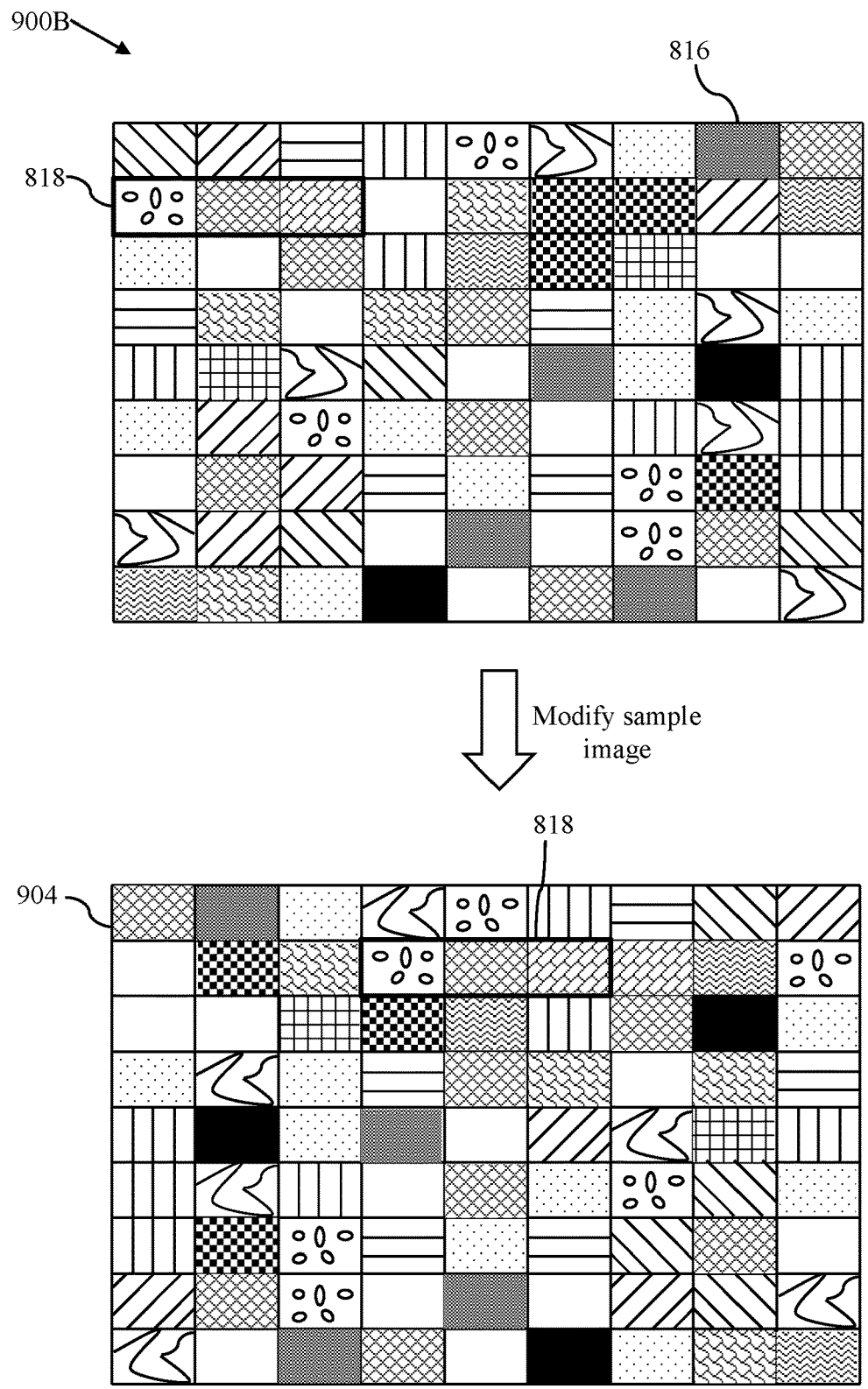
FIG. 9B is a block diagram that illustrates an exemplary sample image and an exemplary modified sample image, in accordance with another embodiment of the disclosure.

FIG. 9B is a block diagram 900B that illustrates an exemplary sample image and an exemplary modified sample image, in accordance with another embodiment of the disclosure. In another embodiment, the application server 106 may be configured to modify the sample images 306 by altering the position of the unique pattern. In an exemplary scenario, the application server 106 may be configured to modify color tones of colored-blocks other than the unique pattern 818 to generate the modified sample image 902. For example, as shown in FIG. 9B, the sample image 816 having the unique pattern 818 is modified by the application server 106 is to generate a modified sample image 904. The position of the unique pattern 818 in the modified sample image 904 is different from the position of the unique pattern 818 in the sample image 816. The modified sample image 904 may be generated by systematically altering the position of the unique pattern 818 in the sample image 816 such that the association between the unique pattern and the psychometric features is not compromised in the modified sample image 904.

Figure 10A:
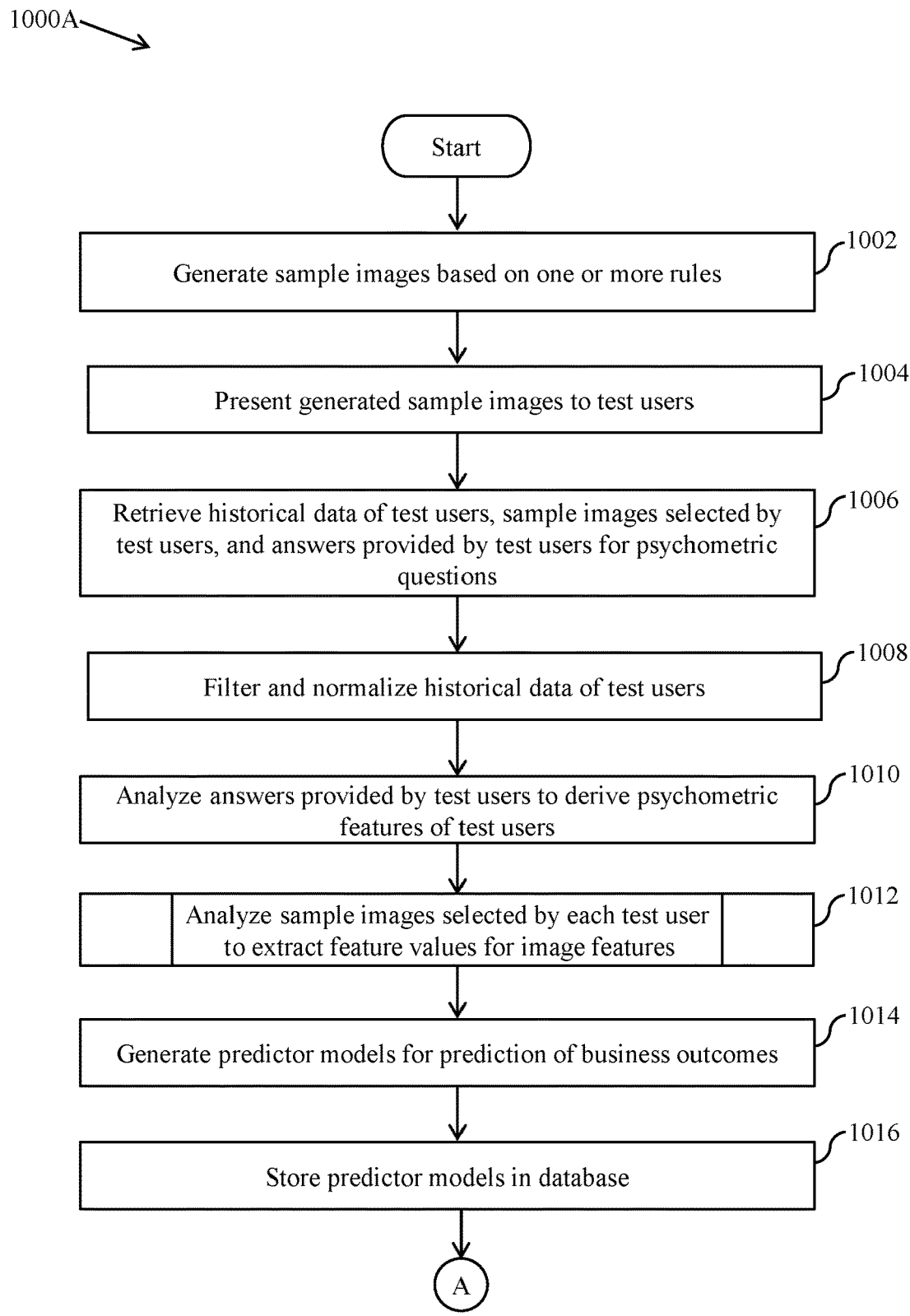
FIGS. 10A-10D, collectively represent a flow chart that illustrates a method for predicting business outcomes, in accordance with an embodiment of the disclosure.
Figure 10B:
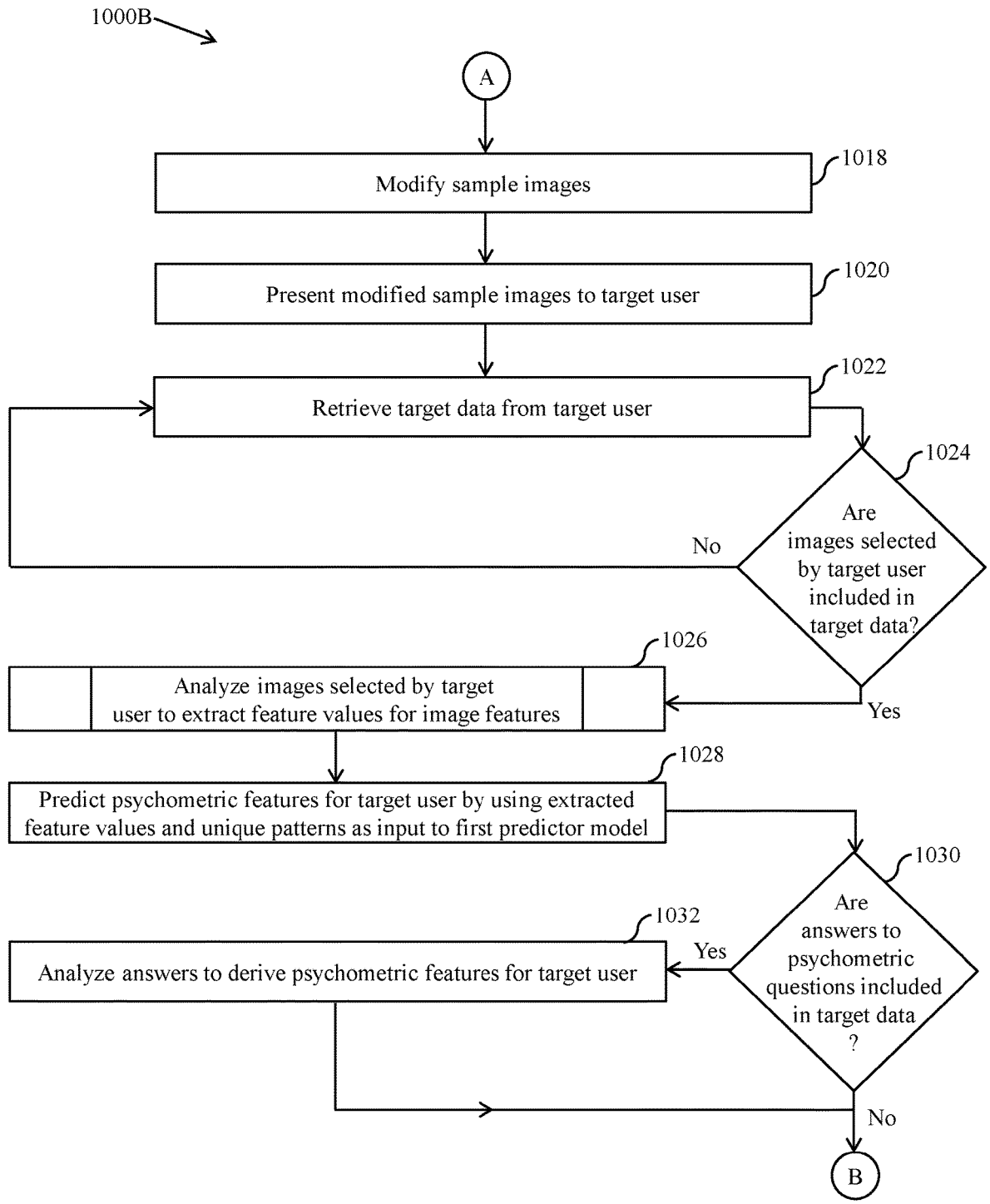
Figure 10C:
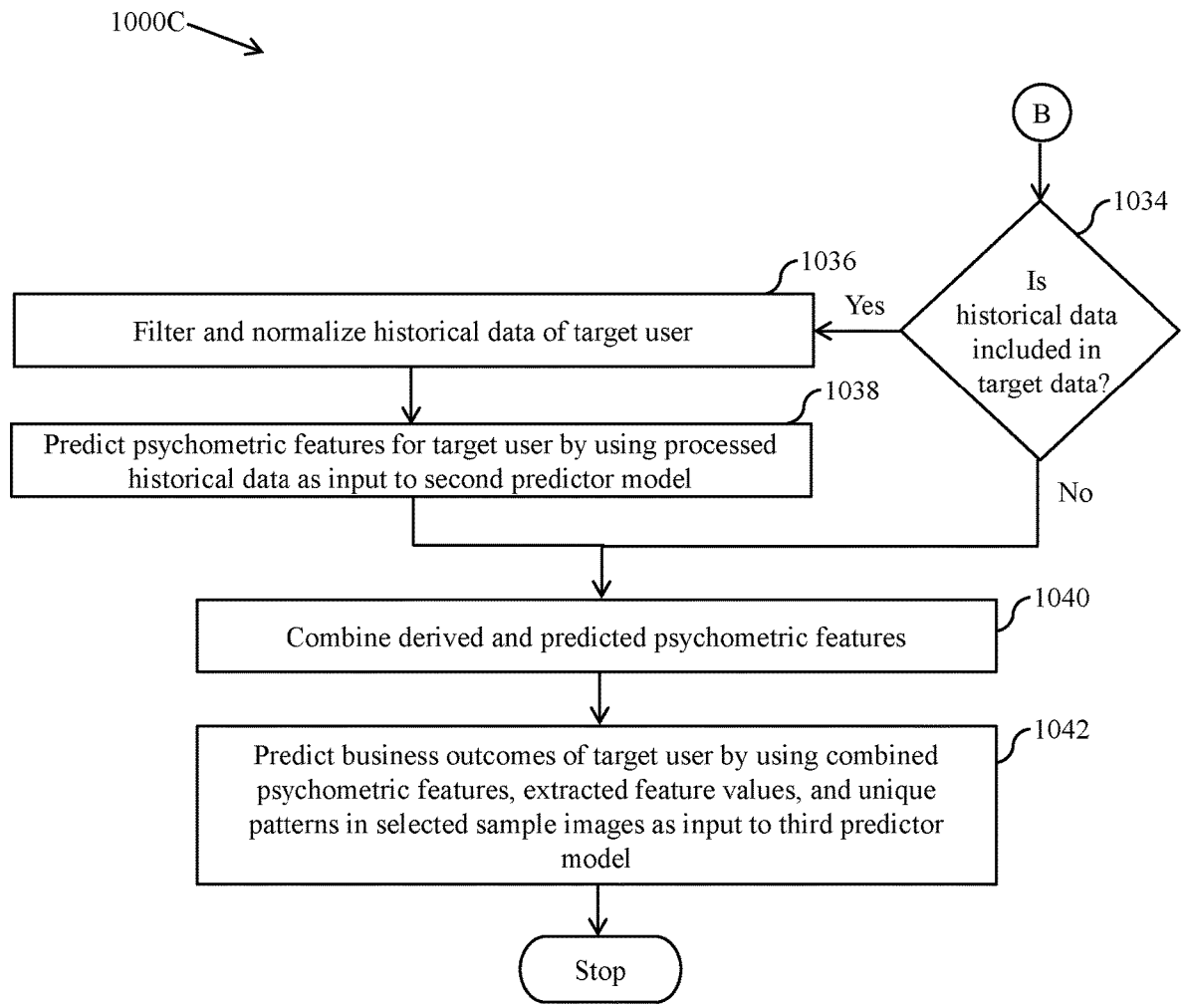

FIGS. 10A-10D, collectively represent a flow chart 1000 that illustrates a method for predicting business outcomes, in accordance with an embodiment of the disclosure. Referring now to FIGS. 10A-10C, at 1002, the sample images 306 are generated based on one or more rules. For example, as per a first rule, each sample image 306 may include colored-blocks arranged in rows and columns. As per a second rule, each sample image 306 may further include a corresponding unique pattern of colored-blocks. At 1004, the sample images 306 are presented to the test users 102. At 1006 the historical data 312 of the test users 102, the sample images selected by the test users 102 (i.e., the image data 310), and the answers 314 provided by the test users 102 to the psychometric questions (i.e., the sample data 308 as described in FIG. 3) are retrieved. At 1008, the historical data 312 of the test users 102 is filtered and normalized (as described in FIG. 3). At 1010, the answers 314 provided by the test users 102 are analyzed for deriving the psychometric features of the test users 102 (as described in FIG. 3). At 1012, the image data 310 associated with each test user 102 is analyzed for extracting feature values for the image features. The application server 106 may be configured to analyze the image data 310 by selecting one image at a time from the image data 310.

Figure 10D:
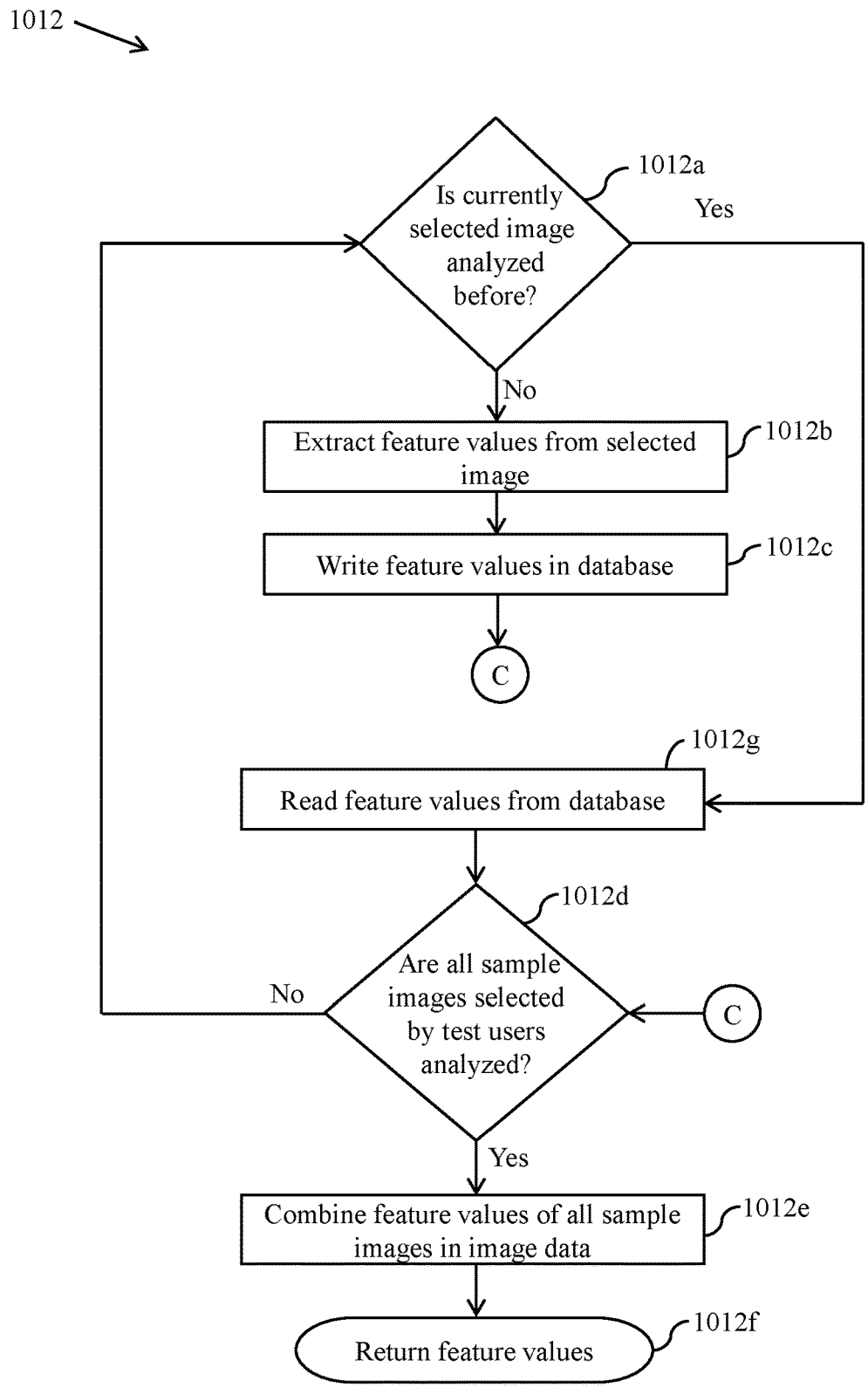
Figure 11:
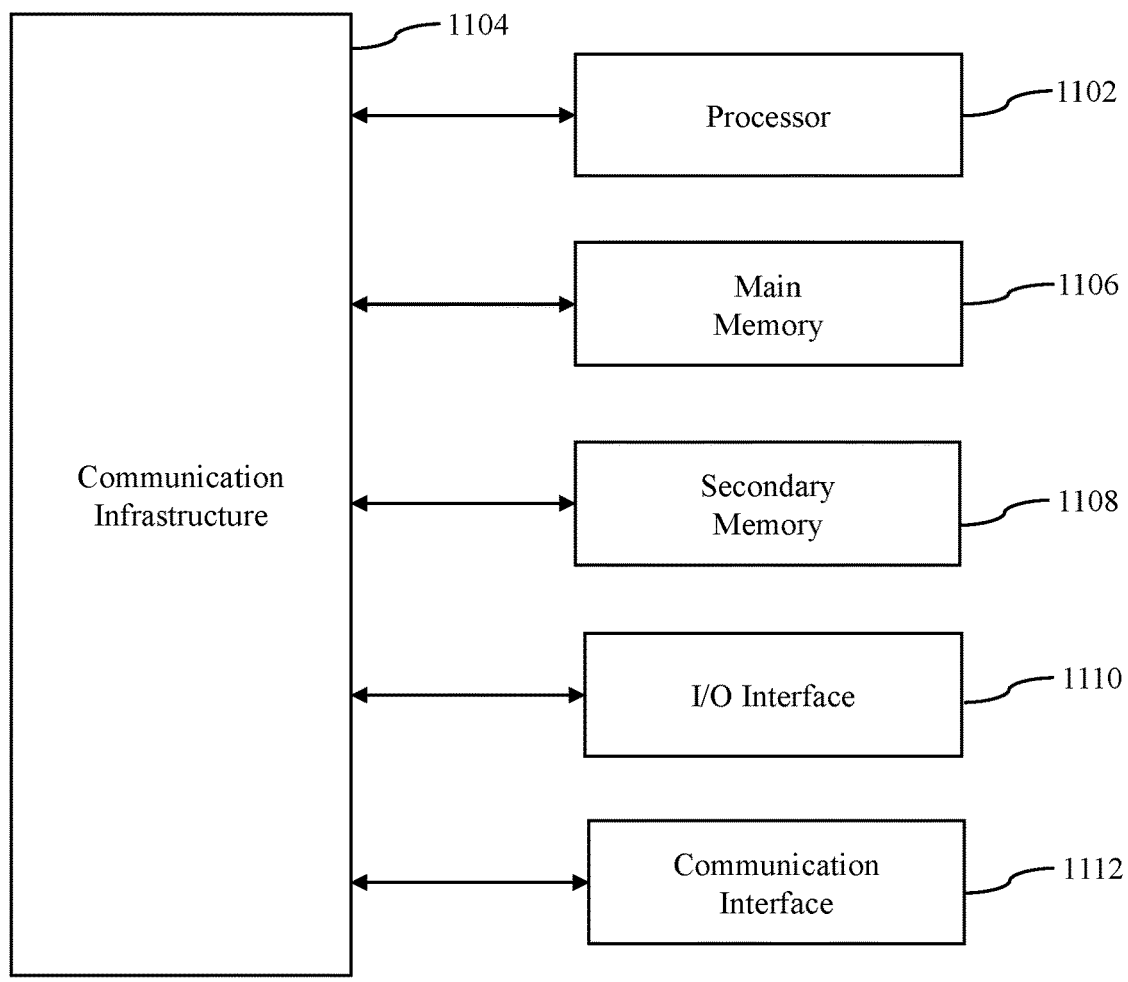
FIG. 11 is a block diagram that illustrates system architecture of a computer system, in accordance with an embodiment of the disclosure.

Referring now to FIG. 10D, at 1012a, it is determined whether the selected sample image has been analyzed before. If at 1012a, it is determined that the selected sample image has not been analyzed before, control passes to 1012b. At 1012b, feature values corresponding to the image features (e.g., tonality, curves, color distribution, semantics, or the like) are extracted from the selected sample image as described in FIG. 3. At 1012c, the feature values are written to the external database server 108. At 1012d, it is determined whether all the selected sample images included in the image data 310 are analyzed. If at 1012d, it is determined that the image data 310 includes one or more images that are not yet analyzed, control passes to 1012a again. If at 1012d, it is determined that all the images included in the image data 310 are analyzed, control passes to 1012e. At 1012e, the feature values corresponding to all sample images included in the image data 310 are combined. At 1012f, the combined feature values are returned and the control passes to 1014. If at 1012a, it is determined that the selected sample image has been analyzed before and the corresponding feature values are stored in the external database server 108, control passes to 1012g. At 1012g, the stored feature values are read from the external database server 108, and control passes to 1012d.

Referring back to FIGS. 10A-10C, at 1014, the predictor models 328 for prediction of business outcomes are generated (as described in FIG. 3). The application server 106 may be configured to use the combined feature values extracted from the image data 310, the analyzed historical data 312, and the derived psychometric features to generate the predictor models 328. At 1016, the generated predictor models 328 are stored in the external database server 108. At 1018, the sample images 306 are modified. The application server 106 may be configured to modify the sample images to generate new sample images (such as the sample images 402), such that the unique patterns of colored-blocks are retained in the new sample images.

At 1020, the modified sample images (e.g., the sample images 402) are presented to the target user 110. At 1022, the target data (such as the target data 404, 502, 602, or 702) is retrieved from the target user 110. At 1024, it is determined whether the target data includes the image data 406 of the target user 110. If at 1024, it is determined that the target data does not include the images selected by the target user 110 (i.e. image data 406), control passes to 1022. The application server 106 may be configured to perform 1022 again until the image data 406 of the target user 110 is retrieved. If at 1024, it is determined that the target data includes the images selected by the target user 110 (i.e. the image data 406), control passes to 1026. At 1026, the selected images (i.e., the image data 406) are analyzed for extracting feature values for the image features (such as tonality, curves, color distribution, semantics, or the like). The process of extracting feature values from the image data 406 is same as that performed for the image data 310 of the test users 102 comprising 1012a-1012g of FIG. 10D. At 1028, the psychometric features of the target user 110 are predicted by using extracted feature values and the unique patterns included in the selected sample images as input to the first predictor model.

At 1030, it is determined whether the target data of the target user 110 includes the answers 410 provided by the target user 110 to the psychometric questions. If at 1030, it is determined that the target data includes the answers 410, control passes to 1032. At 1032, the answers 410 are analyzed for deriving the psychometric features of the target user 110 (as described in FIG. 4). If at 1030, it is determined that the target data does not include the answers 410, control passes to 1034. At 1034, it is determined whether the target data includes the historical data 408 of the target user 110. If at 1034, it is determined that the target data includes the historical data 408, control passes to 1036. At 1036, the historical data 408 of the target user 110 is filtered and normalized. At 1038, the psychometric features for the target user 110 are predicted by using the processed historical data 408 as input to the second predictor model. Control passes to 1040. If at 1034, it is determined that the target data does not include the historical data 408, control passes to 1040. At 1040, the derived and predicted psychometric features are combined. At 1042, the business outcomes for the target user 110 are predicted by using the combined psychometric features, the extracted feature values, and the unique patterns of colored-blocks included in the sample images selected by the target user 110, as input to the third predictor model.

FIG. 10 is a block diagram that illustrates system architecture of a computer system 1000, in accordance with an embodiment of the disclosure. An embodiment of the disclosure, or portions thereof, may be implemented as computer readable code on the computer system 1000. In one example, the test-user and target-user devices 104 and 112, the application server 106, and the external database server 108 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIGS. 10A-10D.

The computer system 1000 may include a processor 1002 that may be a special-purpose or a general-purpose processing device. The processor 1002 may be a single processor, multiple processors, or combinations thereof. The processor 1002 may have one or more processor cores. In one example, the processor 1002 is an octa-core processor. The processor 1002 may be further connected to a communication infrastructure 1004, such as a bus, message queue, multi-core message-passing scheme, and the like. The computer system 1000 may further include a main memory 1006 and a secondary memory 1008. Examples of the main memory 1006 may include RAM, ROM, and the like. The secondary memory 1008 may include a hard disk drive or a removable storage drive, such as a floppy disk drive, a magnetic tape drive, a compact disk, an optical disk drive, a flash memory, and the like. The removable storage drive may further read from and/or write to a removable storage device in a manner known in the art. In one example, if the removable storage drive is a compact disk drive, the removable storage device may be a compact disk. In an embodiment, the removable storage unit may be a non-transitory computer readable recording media.

The computer system 1000 may further include an input/output (I/O) interface 1010 and a communication interface 1012. The I/O interface 1010 may include various input and output devices that are configured to communicate with the processor 1002. Examples of the input devices may include a keyboard, a mouse, a joystick, a touchscreen, a microphone, and the like. Examples of the output devices may include a display screen, a speaker, headphones, and the like. The communication interface 1012 may be configured to allow data to be transferred between the computer system 1000 and various devices that are communicatively coupled to the computer system 1000. Examples of the communication interface 1012 may include a modem, a network interface, i.e., an Ethernet card, a communication port, and the like. Data transferred via the communication interface 1012 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 1000. Examples of the communication channel may include a wired, wireless, and/or optical medium such as cable, fiber optics, a phone line, a cellular phone link, a radio frequency link, and the like. The main memory 1006 and the secondary memory 1008 may refer to non-transitory computer readable mediums that may provide data that enables the computer system 1000 to implement the method illustrated in FIGS. 10A-10D.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

The application server 106 may predict business outcomes for the target user 110. The image generator 218 may generate the sample images 402, such that each sample image 402 may include a corresponding set of colored-blocks and a corresponding unique pattern (e.g., the unique pattern 818) that may be formed by a subset of colored-blocks in the corresponding set of colored-blocks. Each unique pattern may be associated with at least one psychometric feature of a plurality of psychometric features. The first processor 202 may render the UI 814 on the target-user device 112 of the target user 110 to present the sample images 402 for selection. The communication interface 208 may receive the image data 406, i.e., the images selected by the target user 110 from the sample images 402. Based on the unique pattern (e.g., the unique pattern 818) included in each image of the image data 406, the prediction module 216 may predict one or more psychometric features 422 of the target user 110. The predicted one or more psychometric features (e.g., the predicted psychometric features 422, 512, 612, or 710) of the target user 110 may be included in the plurality of psychometric features. The prediction module 216 may further predict one or more business outcomes (e.g., the business outcomes 424, 514, 614, or 712) for the target user 110 based on the one or more psychometric features 422 of the target user 110.

Various embodiments of the disclosure provide a non-transitory computer readable medium having stored thereon, computer executable instructions, which when executed by a computer, cause the computer to execute operations for predicting business outcomes for the target user 110. The operations include generating a first plurality of images (i.e., the sample images 402) such that each image 402 may include a corresponding set of colored-blocks and a corresponding unique pattern (e.g., the unique pattern 818) that may be formed by a subset of colored-blocks in the corresponding set of colored-blocks. Each unique pattern may be associated with at least one psychometric feature of a plurality of psychometric features. The operations further include rendering the UI 814 on the target-user device 112 of the target user 110 to present the first plurality of images 402 for selection. The operations further include receiving a first set of images (i.e., the image data 406) selected by the target user 110 from the first plurality of images 402. The operations further include predicting one or more psychometric features of the target user 110 based on the unique pattern (e.g., the unique pattern 818) included in each image of the first set of images, such that the predicted one or more psychometric features (e.g., the predicted psychometric features 422, 512, 612, or 710) of the target user 110 may be included in the plurality of psychometric features. The operations further include predicting one or more business outcomes (e.g., the business outcomes 424, 514, 614, or 712) for the target user 110 based on the one or more psychometric features of the target user 110.

Various embodiments of the disclosure include the application server 106 which may enable prediction of business outcomes by analyzing image interests of the target user 110. The image interests of the target user 110 may be associated with psychometric features and may accurately reflect the subconscious mind of the target user 110 at any given time instance. The predictor models 328 generated by the application server 106 are trained based on the sample data 308 of multiple test users 102. The sample data 308 includes the image data 310, the historical data 312, and the answers 314 provided by the test users 102, which reflects the subconscious mind of the test users 102. Image interests of the target user 110 are largely associated with what colors a person selects at any given time (i.e., the color preferences). As the subconscious mind is responsible for majority of decision making and directly related to the psychometric orientation, the prediction accuracy of the predictor models 328 is very high. Thus, the disclosure yields more accurate results in comparison to the related techniques. The ability of the predictor models 328 to accurately predict psychometric orientation and business outcomes may provide competitive edge to a service company, utilizing the predictor models 328, over its competitors. For example, the service company may utilize the technological improvements of the predictor models 328 to provide targeted services to the customers. Similarly, for the technological improvements provided by the predictor models 328 enables an organization to keep track of behavioral changes and mental health of corresponding employees by periodically analyzing employees' image interests, rather than hire a psychiatrist or conduct time consuming psychometric tests. The technological improvements provided by the predictor models 328 may be utilized to concurrently predict business outcomes for multiple target users, thereby reducing the time spent by organizations on data analytics for various operations, such as hiring, or the like. Thus, the disclosure has applicability in, and provides improvements in technologies that are customer and employee centric. For example, e-commerce industries, business ventures, customer helpdesks, airline industries, or the like.

Techniques consistent with the disclosure provide, among other features, systems and methods for predicting business outcomes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for determining business outcomes, the method comprising:
   generating, by a server, based on a set of rules, a first plurality of images each including a corresponding set of colored-blocks, wherein each of the first plurality of images includes a corresponding unique pattern formed by a subset of colored-blocks in the corresponding set of colored-blocks;
   rendering, by the server, a user interface on a plurality of user devices of a plurality of test users to present the generated first plurality of images for selection;
   retrieving, by the server, a first set of images selected from the first plurality of images by each test user of the plurality of test users;
   mapping, by the server, each unique pattern of the selected first set of images with at least one psychometric feature of a plurality of psychometric features of the plurality of test users;
   modifying, by the server, the first set of images to generate a second plurality of images such that the unique pattern in each of the first set of images is retained in the second plurality of images;
   rendering, by the server, the user interface on a user device of a target user to present the second plurality of images for selection;
   receiving, by the server, a second set of images selected by the target user from the second plurality of images;
   predicting, by the server, one or more psychometric features of the target user based on the unique pattern included in each image of the second set of images, wherein the one or more psychometric features of the target user are included in the plurality of psychometric features, and wherein the prediction of the one or more psychometric features is agnostic of textual description associated with each image of the second set of images; and
   predicting, by the server, one or more business outcomes for the target user based on the one or more psychometric features of the target user.

2. The method of claim 1, wherein the one or more business outcomes include product purchase affinity, compatibility match, color affinity, or employment suggestions, and wherein the plurality of psychometric features include personality attributes, lifestyle preferences, knowledge, abilities, or aesthetic preferences.

3. The method of claim 1, wherein colored-blocks in the set of colored-blocks of each of the first plurality of images are arranged in a plurality of rows and columns, and wherein the set of colored-blocks of each of the first plurality of images is exclusive of textual content.

4. The method of claim 1, wherein the unique pattern in each of the first plurality of images is formed by the subset of colored-blocks that are adjacent.

5. The method of claim 1, wherein a position of the retained unique pattern in each of the second plurality of images is same as a position of the unique pattern in each of the first set of images.

6. The method of claim 1, wherein a position of the retained unique pattern in each of the second plurality of images is different from a position of the unique pattern in each of the first set of images.

7. The method of claim 1, wherein a colored-block in the set of colored-blocks of each of the first plurality of images is formed by one or more pixels of same color.

8. The method of claim 1, further comprising:
retrieving, by the server, historical data of each test user of the plurality of test users and a first set of answers provided by each test user to a set of psychometric questions;
analyzing, by the server, the first set of answers provided by each test user to derive the plurality of psychometric features of the plurality of test users; and
extracting, by the server, a set of feature values for a set of image features from each image of the first set of images.

9. The method of claim 8, further comprising generating, by the server, one or more predictor models based on the historical data of each test user of the plurality of test users, the derived plurality of psychometric features of the plurality of test users, and the set of feature values, wherein the server uses the predicted one or more psychometric features of the target user as input to the one or more predictor models to predict the one or more business outcomes.

10. The method of claim 1, wherein a rule of the set of rules indicates that the set of colored-blocks that is chosen to generate an image of the first plurality of images corresponds to a known emotional state.

11. The method of claim 1, further comprising extracting, by the server, from the second set of images, a set of feature values for a set of image features, wherein the set of feature values is extracted from the second set of images based on a chronological order associated with the second set of images, and wherein the chronological order associated with the second set of images is indicated by a set of date and time markers associated with the respective second set of images.

12. The method of claim 11, further comprising determining, by the server, one or more behavioral changes exhibited by the target user over a time period based on the extraction, in the chronological order, from the second set of images, wherein the one or more business outcomes are further predicted based on the one or more behavioral changes of the target user.

13. A system for predicting business outcomes, the system comprising:
a server that is configured to:
generate, based on a set of rules, a first plurality of images each including a corresponding set of colored-blocks, wherein each of the first plurality of images includes a corresponding unique pattern formed by a subset of colored-blocks in the corresponding set of colored-blocks;
render a user interface on a plurality of user devices of a plurality of test users to present the generated first plurality of images for selection;
retrieve a first set of images selected from the first plurality of images by each test user of the plurality of test users;
map each unique pattern of the first set of images with at least one psychometric feature of a plurality of psychometric features of the plurality of test users;
modify the first set of images to generate a second plurality of images such that the unique pattern in each of the first set of images is retained in the second plurality of images;
render the user interface on a user device of a target user to present the second plurality of images for selection;
receive a second set of images selected by the target user from the second plurality of images;
predict one or more psychometric features of the target user based on the unique pattern included in each image of the second set of images, wherein the one or more psychometric features of the target user are included in the plurality of psychometric features, and wherein the prediction of the one or more psychometric features is agnostic of textual description associated with each image of the second set of images; and
predict one or more business outcomes for the target user based on the one or more psychometric features of the target user.

14. The system of claim 13, wherein the one or more business outcomes include product purchase affinity, compatibility match, color affinity, or employment suggestions, and wherein the plurality of psychometric features include personality attributes, lifestyle preferences, knowledge, abilities, or aesthetic preferences.

15. The system of claim 13, wherein colored-blocks in the set of colored-blocks of each of the first plurality of images are arranged in a plurality of rows and columns, wherein the unique pattern in each of the first plurality of images is formed by the subset of colored-blocks that are adjacent, and wherein the set of colored-blocks of each of the first plurality of images is exclusive of textual content.

16. The system of claim 13, wherein a position of the retained unique pattern in each of the second plurality of images is different from a position of the unique pattern in each of the first set of images.

17. The system of claim 13, wherein a colored-block in the set of colored-blocks of each of the first plurality of images is formed by one or more pixels of same color.

18. The system of claim 13, wherein the server is further configured to:
retrieve historical data of each test user of the plurality of test users and a first set of answers provided by each test user to a set of psychometric questions;
analyze the first set of answers provided by each test user to derive the plurality of psychometric features of the plurality of test users; and
extract a set of feature values for a set of image features from each image of the first set of images.

19. The system of claim 18, wherein the server is further configured to generate one or more predictor models based on the historical data of each test user of the plurality of test users, the derived plurality of psychometric features of the plurality of test users, and the set of feature values, and wherein the server uses the predicted one or more psychometric features of the target user as input to the one or more predictor models to predict the one or more business outcomes.

20. A non-transitory computer readable medium having stored thereon, computer executable instruction, which when executed by a computer, cause the computer to execute operations, the operations comprising:

generating, based on a set of rules, a first plurality of images each including a corresponding set of colored-blocks, wherein each of the first plurality of images includes a corresponding unique pattern formed by a subset of colored-blocks in the corresponding set of colored-blocks;

rendering a user interface on a plurality of user devices of a plurality of test users to present the generated first plurality of images for selection;

retrieving a first set of images selected from the first plurality of images by each test user of the plurality of test users;

mapping each unique pattern of the selected first set of images with at least one psychometric feature of a plurality of psychometric features of the plurality of test users;

modifying the first set of images to generate a second plurality of images such that the unique pattern in each of the first set of images is retained in the second plurality of images;

rendering the user interface on a user device of a target user to present the second plurality of images for selection;

receiving a second set of images selected by the target user from the second plurality of images;

predicting one or more psychometric features of the target user based on the unique pattern included in each image of the first set of images, wherein the one or more psychometric features of the target user are included in the plurality of psychometric features, and wherein the prediction of the one or more psychometric features is agnostic of textual description associated with each image of the second set of images; and predicting one or more business outcomes for the target user based on the one or more psychometric features of the target user.

* * * * *